United States Patent
Wake

(10) Patent No.: US 7,730,105 B2
(45) Date of Patent: Jun. 1, 2010

(54) TIME SHARING MANAGING APPARATUS, DOCUMENT CREATING APPARATUS, DOCUMENT READING APPARATUS, TIME SHARING MANAGING METHOD, DOCUMENT CREATING METHOD, AND DOCUMENT READING METHOD

(75) Inventor: Nobuaki Wake, Tokushima (JP)

(73) Assignee: JustSystems Corporation, Tokushima (JP)

( * ) Notice: Subject to any disclaimer, the term of this patent is extended or adjusted under 35 U.S.C. 154(b) by 308 days.

(21) Appl. No.: 11/576,201

(22) PCT Filed: Oct. 27, 2005

(86) PCT No.: PCT/JP2005/019823

§ 371 (c)(1),
(2), (4) Date: Nov. 14, 2007

(87) PCT Pub. No.: WO2006/046664

PCT Pub. Date: May 4, 2006

(65) Prior Publication Data

US 2008/0104093 A1 May 1, 2008

(30) Foreign Application Priority Data

Oct. 27, 2004 (JP) ............................. 2004-312830

(51) Int. Cl.
G06F 7/00 (2006.01)
G06F 17/00 (2006.01)

(52) U.S. Cl. .................. 707/802; 707/803; 707/804

(58) Field of Classification Search .................. None
See application file for complete search history.

(56) References Cited

U.S. PATENT DOCUMENTS

| 6,343,316 | B1 * | 1/2002 | Sakata | 709/213 |
| 7,590,993 | B1 * | 9/2009 | Hendricks et al. | 725/35 |
| 2002/0029238 | A1 * | 3/2002 | Okuhata | 709/101 |
| 2004/0059742 | A1 * | 3/2004 | Altman | 707/100 |

FOREIGN PATENT DOCUMENTS

| JP | 2001-290804 A | 10/2001 |
| JP | 2001-306551 A | 11/2001 |
| JP | 2004-13737 A | 1/2004 |

* cited by examiner

*Primary Examiner*—Kuen S Lu
*Assistant Examiner*—Tuan Pham
(74) *Attorney, Agent, or Firm*—Sughrue Mion, PLLC

(57) ABSTRACT

Time information included in a document file can be efficiently shared by multiple people. A time information communication unit (260) receives time information included as a content of a document file. An ID setting unit (254) then sets a time ID for the time information. A time information storage unit (258) relates and stores the time ID and the time information. Thereafter, the time information communication unit (260) transmits the time ID. A change request communication unit (262) receives time change information for changing the time information related to the time ID. The time information communication unit (260) receives time request information for inquiring for time information. A search unit (256) finds time information from the time information storage unit (258) in response to the time request information. The time information communication unit (260) then transmits the time information thus found to the transmission source of the time request information.

6 Claims, 21 Drawing Sheets

FIG.2

```
<?xml version="1.0" ?>

<?org.chimaira vocabulary-connection href="records.vcd" ?>
<marks xmlns="http://xmlns.justsystem.com/sample/records">
   <student name="A">
      <japanese>90</japanese>
      <math>50</math>
      <science>75</science>
      <social>60</social>
   </student>
   <student name="B">
      <japanese>45</japanese>
      <math>60</math>
      <science>55</science>
      <social>50</social>
   </student>
   <student name="C">
      <japanese>55</japanese>
      <math>45</math>
      <science>95</science>
      <social>40</social>
   </student>
   <student name="D">
      <japanese>25</japanese>
      <math>35</math>
      <science>40</science>
      <social>15</social>
   </student>
</marks>
```

FIG.4A

```xml
<?xml version="1.0"?>

<vc:vcd xmlns:vc="http://xmlns.chimaira.org/vcd"
        xmlns:src="http://xmlns.justsystem.com/sample/records"
        xmlns="http://www.w3.org/1999/xhtml"
        version="1.0">
<!-- Commands -->
<vc:command name="add student">
  <vc:insert-fragment
      target="ancestor-or-self::src:student"
      position="after">
    <src:student/>
  </vc:insert-fragment>
</vc:command>
<vc:command name="delete student">
  <vc:delete-fragment target="ancestor-or-self::src:student" />
</vc:command>

<!-- Templates -->
<vc:vc-template match="src:marks" name="report card" >

<vc:ui command="add student">
    <vc:mount-point>
      /MenuBar/report card/add student
    </vc:mount-point>
  </vc:ui>
  <vc:ui command="delete student">
    <vc:mount-point>
      /MenuBar/report card/delete student
    </vc:mount-point>
  </vc:ui>

<html>
    <head>
      <title>report card</title>
      <style>
        td, th {
          text-align:center;
          border-right:solid black 1px;
          border-bottom:solid black 1px;
          border-top:none 0px;
          border-left:none 0px;
        }
        table{
          border-top:solid black 2px;
          border-left:solid black 2px;
          border-right:solid black 1px;
          border-bottom:solid black 1px;
          border-spacing:0px;
        }
```

FIG.4B

```
            tr {
               border:none;
            }
            .data {
               padding:0.2em 0.5em;
            }
         </style>
      </head>
      <body>
         <h1>MARKS TABLE</h1>
         <table>
            <tr><th><div class="data">NAME</div></th>
            <th></th>
            <th><div class="data">JAPN</div></th>
            <th><div class="data">MATH</div></th>
            <th><div class="data">SCI</div></th>
            <th><div class="data">SS</div></th>
            <th></th>
            <th><div class="data">AVE</div></th> </tr>
            <vc:apply-templates select="src:student" />
         </table>
      </body>
   </html>
</vc:vc-template>

<vc:template match="src:student">
   <tr>
      <td><div class="data">
         <vc:text-of select="@name" fallback="no name"/></div></td>
      <td></td>
      <td><div class="data">
         <vc:text-of select="src:japanese"
            fallback="0" type="vc:integer" /></div></td>
      <td><div class="data">
         <vc:text-of select="src:math"
            fallback="0" type="vc:integer" /></div></td>
      <td><div class="data">
         <vc:text-of select="src:science"
            fallback="0" type="vc:integer" /></div></td>
      <td><div class="data">
         <vc:text-of select="src:social"
            fallback="0" type="vc:integer" /></div></td>
      <td></td>
      <td><div class="data">
         <vc:value-of
select="(src:japanese+src:math+src:science+src:social) div 4" />
      </div></td>
   </tr>
</vc:template>

</vc:vcd>
```

FIG.5

| sample.xml | | | | | |
|---|---|---|---|---|---|
| MARKS TABLE | | | | 90 | |
| NAME | JAPN | MATH | SCI | SS | AVE |
| A | 90 | 50 | 75 | 60 | 68.8 |
| B | 45 | 60 | 55 | 50 | 52.5 |
| C | 55 | 45 | 95 | 40 | 58.8 |
| D | 25 | 35 | 40 | 15 | 28.8 |

| MARKS TABLE | | | | |
|---|---|---|---|---|
| NAME | JAPN | MATH | SCI | SS |
| A | 90 | 50 | 75 | 60 |
| B | 45 | 60 | 55 | 50 |
| C | 55 | 45 | 95 | 40 |
| D | 25 | 35 | 40 | 15 |

96 marks
— student – name  A
   — japanese  90
   — math  50
   ...
...

95

```
<?xml version="1.0" ?>
<marks xmlns="...">
<student name="A">
...
```

```
<?xml version="1.0" ?>

<svg xmlns="http://www.w3.org/2000/svg"
     width="400" height="200"
     viewBox="0 0 400 200"
>
  <rect x="-15" y="65" width="150" height="100" rx="20"
        transform="rotate(-20)"
        style="fill:none; stroke:purple; stroke-width:10"
  />
  <foreignObject x="190" y="10" width="200" height="200">
    <html xmlns="http://www.w3.org/1999/xhtml">
      <head><title /></head>
      <body bgcolor="#FFFFCC" text="darkgreen">
        <div style="font-size:12pt">
          Using <foreignObject>, XHTML document is
          embedded in SVG document.
          Mathmatical expression is also inserted:
          <div>
            <math xmlns="http://www.w3.org/1998/Math/MathML">
              <mi>x</mi>
              <mo>=</mo>
              <mfrac>
                <mrow>
                  <mo>-</mo>
                  <mi>b</mi>
                  <mo>±</mo>
                  <msqrt>
                    <mrow>
                      <msup>
                        <mi>b</mi>
                        <mn>2</mn>
                      </msup>
                      <mo>-</mo>
                      <mn>4</mn>
                      <mi>a</mi>
                      <mi>c</mi>
                    </mrow>
                  </msqrt>
                </mrow>
                <mrow>
                  <mn>2</mn>
                  <mi>a</mi>
                </mrow>
              </mfrac>
            </math>
          </div><!-- math -->
        </div>
      </body>
    </html>
  </foreignObject>
</svg>
```

FIG.17

| | | 1 | 2 | 3 | 4 |
|---|---|---|---|---|---|
| 6 | 7 | 8 DRAFTING QUESTIONNAIRE | 9 –702  704 | 10 DEADLINE OF QUESTIONNAIRE | 11 |
| 13 | 14 | 15 | 16 | 17 | 18 |
| 20 | 21 | 22 | 23 | 24 | 25 |

[QUESTIONNAIRE 1]
FILE (F)  EDIT (E)  DISPLAY (V)

700

TIME SHARING MANAGING APPARATUS, DOCUMENT CREATING APPARATUS, DOCUMENT READING APPARATUS, TIME SHARING MANAGING METHOD, DOCUMENT CREATING METHOD, AND DOCUMENT READING METHOD

TECHNICAL FIELD

The present invention relates to time management techniques, particularly to techniques for managing time information via a network.

BACKGROUND ART

In recent years, exchanging electronic information via a network has become widespread due to the spread of computers and the advance of network techniques. This has been promoting the replacement of conventional paper-based office operations by network-based operations.

In companies, knowledge management for utilizing knowledge or information of individuals for the entire organization is becoming an essential management technique. Many companies have their database systems to accumulate information from employees as electronic files therein. Employees also can access the files accumulated in the in-house database via a network. Thus, business efficiency can be improved in the whole organization.

For example, when multiple employees cooperatively work on a task (hereinafter such task is called "cooperative task"), a manager such as a project leader creates a schedule for the task. The schedule file created by the manager is then stored in an in-house database. Thereafter, persons concerned refer to the schedule file and manage their own schedules with scheduler software or the like.

[Patent Document 1]
Japanese Patent Application Laid-open No. 2001-290804

DISCLOSURE OF INVENTION

Problems to be Solved by the Invention

A schedule for a cooperative task may often be changed typically due to its rate of progress or external factors. In such a case, the person who changed the schedule generally notifies other persons concerned of the updating of the schedule file by an e-mail or other notification means. Persons concerned then refer to the schedule file as changed and rearrange their schedules. The change of the schedule file may affect the priority of tasks that a person concerned takes charge of.

However, the operational procedure of cooperative tasks as stated above has problems mainly as listed below.

(1) The manager may often select wrong persons to be notified of the change of the schedule. Or persons concerned may often forget that they received the change notification.

(2) Each time the schedule file is changed, persons concerned with the cooperative task have to input the change so as to reflect it in their schedule software, etc. Accordingly, a change of the schedule file causes input loads on the persons concerned.

(3) Time differences or differences in setting clocks may cause differences in perception of time among persons concerned. Accordingly, care needs to be taken to prevent misunderstanding among the persons concerned as to when the schedule file was created or changed.

The present invention has been made in view of the aforementioned problems, and a general purpose thereof is to provide techniques for cooperative management of time information among multiple people.

Means for Solving the Problems

To solve the problems above, a time sharing managing apparatus of an aspect of the present invention comprises: a document storage unit for storing a document file to be viewed on a document reading apparatus for viewing a document file; a time information identifying unit for identifying a character string representing a time with a given form of expression from among data included as contents of a document file, by detecting such form of expression; a time information extraction unit for extracting the time represented by the identified character string as time information; a rule storage unit for storing rule information stating a rule for setting a time ID uniquely identifying time information; an ID setting unit for setting a time ID for the extracted time information with reference to the rule information; a time information storage unit for relating and storing the time ID as set and the time information; an ID adding unit for adding the time ID to the document file; a document transmitting unit for transmitting to the document reading apparatus the document file with the time ID added thereto; a change input unit for receiving an input from a document creator for changing time information included as a content of a document file; a change instruction unit for instructing the time information storage unit to re-relate the changed time information to the time ID and store them when the input for changing the time information is received; a time request receiving unit for receiving time request information which includes the time ID and which inquires for time information corresponding to the time ID, from the document reading apparatus; a time information finding unit for finding time information that has been related to the time ID included in the time request information, in the time information storage unit when the time request information is received; and a time information transmitting unit for transmitting the time information thus found to the document reading apparatus.

A "document file" may be digital data including character strings, images or audio, for example. A document files may also be a file described in a markup language such as the Hyper Text Markup Language (HTML), Extensible Markup Language (XML) or Standard Generalized Markup Language (SGML). XML has been especially attracting attention in recent years as a form suitable for sharing data with other people via a network, and many applications for creating, displaying and editing XML documents have been developed accordingly.

A character string representing a time may be specified by a document creator. Time information may be a character string expressed in a format such as "Jun. 7, 2004" or "2004/6/7", for example, as long as it specifies a time. A time ID may be added to a document file as tag information such as an XML tag, for example. Or the ID adding unit may replace a character string representing a time included in a document file with a character string representing a time ID.

According to this aspect, time information included in a document file is managed by a time ID. Therefore, even when time information is changed, a document reader can readily acquire the latest time information based on the time ID.

Another aspect of the present invention is also a time sharing managing apparatus. This apparatus comprises: a time information receiving unit for receiving time information expressed in a given form, which is in data included as contents of a document file; a rule storage unit for storing rule information stating a rule for setting a time ID uniquely identifying time information; an ID setting unit for setting a time ID for the received time information with reference to the rule information; a time information storage unit for relating and storing the time ID as set and the time information; an ID transmitting unit for transmitting the time ID to the transmission source of the time information; a change information receiving unit for receiving time change information for changing time information related to the time ID; a change instruction unit for instructing the time information storage unit to re-relate the changed time information to the time ID and store them when the time change information is received; a time request receiving unit for receiving time request information which includes the time ID and which inquires for time information corresponding to the time ID, from said document reading apparatus; a time information finding unit for finding time information that has been related to the time ID included in the time request information, in the time information storage unit when the time request information is received; and a time information transmitting unit for transmitting the time information thus found to the transmission source of the time request information.

Also in this aspect, time information included in a document file is managed by a time ID. Therefore, even when time information in a document file is changed by an external device, a document reader can readily acquire the latest time information from the time sharing managing apparatus, based on the time ID managed by the time sharing managing apparatus.

Yet another aspect of the present invention is also a time sharing managing apparatus. This apparatus comprises: an ID request receiving unit for receiving ID request information for requesting the issuance of a time ID uniquely identifying time information; a time information generating unit for measuring the time and generating time information when the ID request information is received; a rule storage unit for storing rule information stating a rule for setting a time ID; an ID setting unit for setting a time ID for the generated time information with reference to the rule information; a time information storage unit for relating and storing the time ID as set and the time information; an ID transmitting unit for transmitting the time ID to the transmission source of the ID request information; a time request receiving unit for receiving time request information which includes the time ID and which inquires for time information corresponding to the time ID, from said document reading apparatus; a time information finding unit for finding time information that has been related to the time ID included in the time request information, in the time information storage unit; and a time information transmitting unit for transmitting the time information thus found to the transmission source of the time request information.

According to this aspect, the time sharing managing apparatus generates time information and a time ID in response to an external request. Since the time sharing managing apparatus generates time information as a basis, it is effective in certifying the transmission time of a document file, for example.

Still yet another aspect of the present invention is a document creating apparatus. This apparatus comprises: a document storage unit for storing a document file that includes a character string representing a time with a given form of expression as a content; a time extraction unit for extracting the character string from the document file by detecting such form of expression; an ID requesting unit for transmitting ID request information to a time sharing managing apparatus for managing time IDs so as to request the issuance of a time ID, which uniquely identifies time information, for the time information represented by the character string thus extracted; an ID receiving unit for receiving the time ID that was related to the time information by the time sharing managing apparatus; an ID adding unit for adding the received time ID to the document file; a document transmitting unit for transmitting the document file with the time ID added thereto to a document reading apparatus for viewing a document file; a change input unit for receiving an input from a document creator for changing the time information included as a content of the document file; and a time change transmitting unit for transmitting time change information to the time sharing managing apparatus so as to request re-relating of the changed time information to the time ID when the input for changing the time information is received.

A further aspect of the present invention is a document reading apparatus. This apparatus comprises: a document storage unit for storing a document file that includes a time ID for uniquely identifying time information as content data; an ID extraction unit for extracting the time ID from the document file; a time information requesting unit for transmitting time request information for inquiring for time information related to the extracted time ID, to a time sharing managing apparatus that relates and manages a time ID and time information; a time information receiving unit for receiving time information corresponding to the time ID from the time sharing managing apparatus; a character string conversion unit for converting the received time information to a character string representing a time with a given form of expression; a time adding unit for adding to the document file the converted character string corresponding to the time ID included in the document file; and a document display unit for displaying the document file with the character string added thereto on the screen.

According to these aspects, a time ID is assigned to time information included in a document file. When time information in a document file is changed, the time information as changed is related to the time ID. Therefore, even when time information is changed, a document reader can acquire the latest time information based on the time ID.

Optional combinations of the aforementioned constituting elements, and implementations of the invention in the form of methods, apparatuses, systems, computer programs, recording mediums storing computer programs and data structures may also be practiced as additional modes of the present invention.

[Advantages]

The present invention has an advantage in that time information can be cooperatively managed by multiple people.

BRIEF DESCRIPTION OF THE DRAWINGS

FIG. 2 is a diagram which shows an example of an XML document to be processed.

FIG. 4(*a*) is a diagram which shows an example of a definition file used for mapping the XML document shown in FIG. 2 to the table shown in FIG. 3.

FIG. 4(*b*) is a diagram which shows an example of a definition file used for mapping the XML document shown in FIG. 2 to the table shown in FIG. 3.

FIG. 5 is a diagram which shows an example of a screen on which the XML document described in the marks managing vocabulary as shown in FIG. 2 is displayed after having been mapped to HTML according to the correspondence shown in FIG. 3.

FIG. 6 is a diagram which shows an example of a graphical user interface provided by a definition file generating unit, which allows the user to create a definition file.

FIG. 8 is a diagram which shows an example of an editing screen for an XML document, as provided by the document processing apparatus.

FIG. 9 is a diagram which shows another example of an XML document which is to be edited by the document processing apparatus.

FIG. 17 is a diagram which shows a calendar screen of schedule management software displayed on the document reading apparatus.

Figure 1:
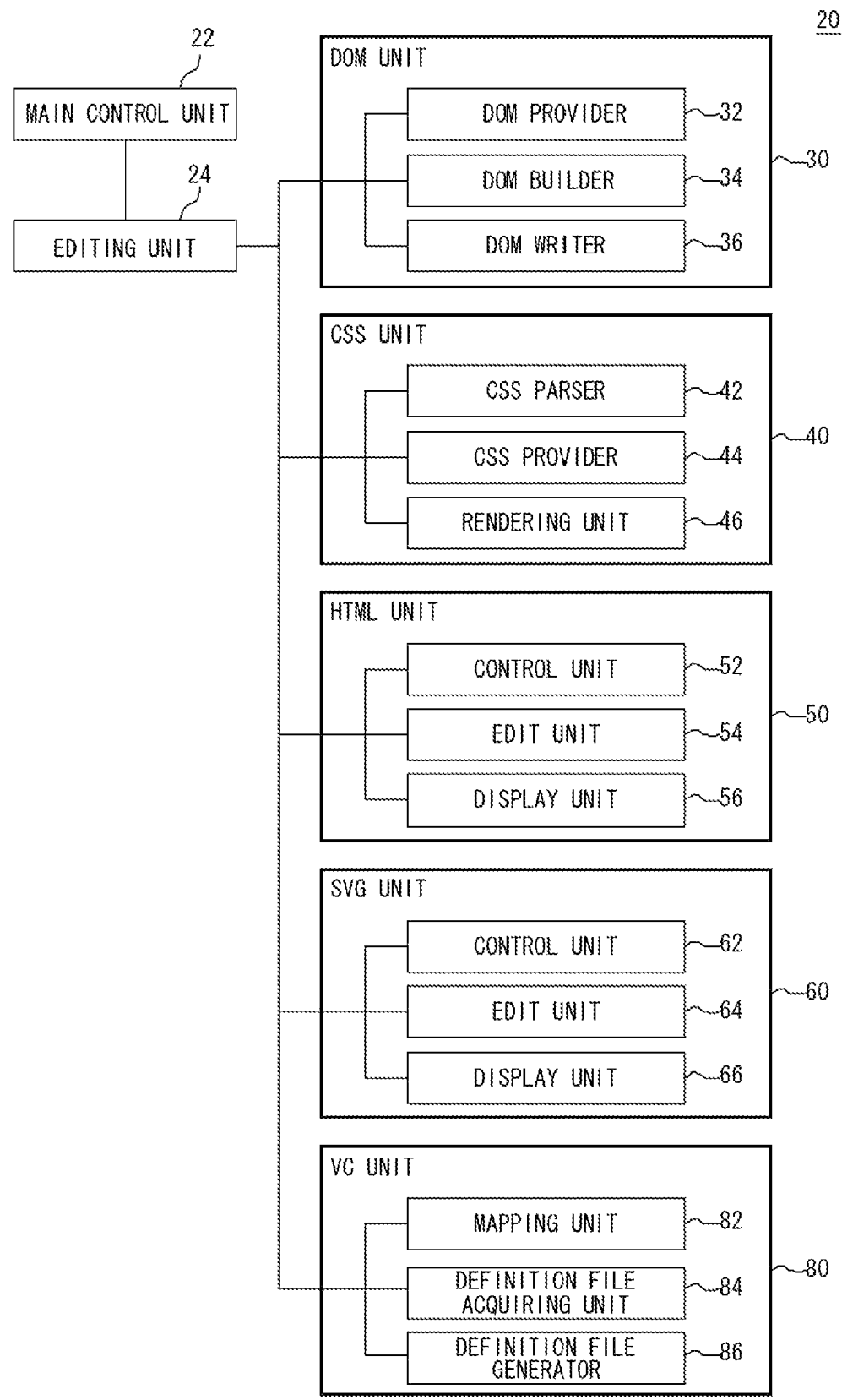
FIG. 1 is a diagram which shows a configuration of a document processing apparatus according to the background technique.

REFERENCE NUMERALS 20 document processing apparatus
22 main control unit
24 editing unit
30 DOM unit
32 DOM provider
34 DOM builder
36 output unit
40 CSS unit
41 CSS parser
44 CSS provider
45 rendering unit
50 HTML unit
52, 62 control unit
54, 64 edit unit
56, 66 display unit
60 SVG unit
72 document acquisition unit
74 namespace URI acquisition unit
76 definition file name creating unit
80 VC unit
82 mapping unit
84 definition file acquisition unit
86 definition file generating unit
192 document managing system
250 time sharing managing apparatus
252 communication unit
254 ID setting unit
256 search unit
258 time information storage unit
260 time information communication unit
262 change request communication unit
264 time measuring unit
266 time information change instruction unit
300 document creating apparatus
302 user interface processing unit
304 communication unit
306 time extraction unit
308 ID adding unit
310 original document file storage unit
312 ID-added document file storage unit
314 document communication unit
316 time information communication unit
318 change request transmitting unit
400 document reading apparatus
402 user interface processing unit
404 communication unit
406 restoration processing unit
408 ID extraction unit
410 restored document file storage unit
412 ID-added document file storage unit
414 document communication unit
416 time information communication unit
418 change notification receiving unit
420 ID conversion unit
422 computing unit Best Mode for Carrying Out the Invention A background technique for the present invention will now be described below before an embodiment is discussed in detail.

(Background Technique)

FIG. 1 illustrates a structure of a document processing apparatus 20 according to the background technique. The document processing apparatus 20 processes a structured document where data in the document are classified into a plurality of components having a hierarchical structure. Represented in the background technique is an example in which an XML document, as one type of a structured document, is processed. The document processing apparatus 20 is comprised of a main control unit 22, an editing unit 24, a DOM unit 30, a CSS unit 40, an HTML unit 50, an SVG unit 60 and a VC unit 80 which serves as an example of a conversion unit. In terms of hardware components, these unit structures may be realized by any conventional processing system or equipment, including a CPU or memory of any computer, a memory-loaded program, or the like. Here, the drawing shows a functional block configuration which is realized by cooperation between the hardware components and software components. Thus, it would be understood by those skilled in the art that these function blocks can be realized in a variety of forms by hardware only, software only or the combination thereof.

The main control unit 22 provides for the loading of a plug-in or a framework for executing a command. The editing unit 24 provides a framework for editing XML documents. Display and editing functions for a document in the document processing apparatus 20 are realized by plug-ins, and the necessary plug-ins are loaded by the main control unit 22 or the editing unit 24 according to the type of document under consideration. The main control unit 22 or the editing unit 24 determines which vocabulary or vocabularies describe the content of an XML document to be processed, by referring to a name space of the document to be processed, and loads a plug-in for display or editing corresponding to the thus determined vocabulary so as to execute the display or the editing. For instance, an HTML unit 50, which displays and edits HTML documents, and an SVG unit 60, which displays and edits SVG documents, are implemented in the document processing apparatus 20. That is, a display system and an editing system are implemented as plug-ins for each vocabulary (tag set), so that when an HTML document and an SVG document are edited, the HTML unit 50 and the SVG unit 60 are loaded, respectively. As will be described later, when compound documents, which contain both the HTML and SVG components, are to be processed, both the HTML unit 50 and the SVG unit 60 are loaded.

By implementing the above structure, a user can select so as to install only necessary functions, and can add or delete a function or functions at a later stage, as appropriate. Thus, the storage area of a recording medium, such as a hard disk, can be effectively utilized, and the wasteful use of memory can be prevented at the time of executing programs. Furthermore, since the capability of this structure is highly expandable, a developer can deal with new vocabularies in the form of plug-ins, and thus the development process can be readily facilitated. As a result, the user can also add a function or functions easily at low cost by adding a plug-in or plug-ins.

The editing unit 24 receives an event, which is an editing instruction, from the user via the user interface. Upon reception of such an event, the editing unit 24 notifies a suitable plug-in or the like of this event, and controls the processing such as redoing this event, canceling (undoing) this event, etc.

The DOM unit 30 includes a DOM provider 32, a DOM builder 34 and a DOM writer 36. The DOM unit 30 realizes functions in compliance with a document object model (DOM), which is defined to provide an access method used for handling data in the form of an XML document. The DOM provider 32 is an implementation of a DOM that satisfies an interface defined by the editing unit 24. The DOM builder 34 generates DOM trees from XML documents. As will be described later, when an XML document to be processed is mapped to another vocabulary by the VC unit 80, a source tree, which corresponds to the XML document in a mapping source, and a destination tree, which corresponds to the XML document in a mapping destination, are generated. At the end of editing, for example, the DOM writer 36 outputs a DOM tree as an XML document.

The CSS unit 40, which provides a display function conforming to CSS, includes a CSS parser 42, a CSS provider 44 and a rendering unit 46. The CSS parser 42 has a parsing function for analyzing the CSS syntax. The CSS provider 44 is an implementation of a CSS object and performs CSS cascade processing on the DOM tree. The rendering unit 46 is a CSS rendering engine and is used to display documents, described in a vocabulary such as HTML, which are laid out using CSS.

The HTML unit 50 displays or edits documents described in HTML. The SVG unit 60 displays or edits documents described in SVG. These display/editing systems are realized in the form of plug-ins, and each system is comprised of a display unit (also designated herein as a "canvas") 56 and 66, which displays documents, a control unit (also designated herein as an "editlet") 52 and 62, which transmits and receives events containing editing commands, and an edit unit (also designated herein as a "zone") 54 and 64, which edits the DOM according to the editing commands. Upon the control unit 52 or 62 receiving a DOM tree editing command from an external source, the edit unit 54 or 64 modifies the DOM tree and the display unit 56 or 66 updates the display. These units have a structure similar to the framework of the so-called MVC (Model-View-Controller). With such a structure, in general, the display units 56 and 66 correspond to "View". On the other hand, the control units 52 and 62 correspond to "Controller", and the edit units 54 and 64 and DOM instance corresponds to "Model". The document processing apparatus 20 according to the background technique allows an XML document to be edited according to each given vocabulary, as well as providing a function of editing the HTML document in the form of tree display. The HTML unit 50 provides a user interface for editing an HTML document in a manner similar to a word processor, for example. On the other hand, the SVG unit 60 provides a user interface for editing an SVG document in a manner similar to an image drawing tool.

The VC unit 80 includes a mapping unit 82, a definition file acquiring unit 84 and a definition file generating unit 86. The VC unit 80 performs mapping of a document, which has been described in a particular vocabulary, to another given vocabulary, thereby providing a framework that allows a document to be displayed and edited by a display/editing plug-in corresponding to the vocabulary to which the document is mapped. In the background technique, this function is called a vocabulary connection (VC). In the VC unit 80, the definition file acquiring unit 84 acquires a script file in which the mapping definition is described. Here, the definition file specifies the correspondence (connection) between the nodes for each node. Furthermore, the definition file may specify whether or not editing of the element values or attribute values is permitted. Furthermore, the definition file may include operation expressions using the element values or attribute values for the node. Detailed description will be made later regarding these functions. The mapping unit 82 instructs the DOM builder 34 to generate a destination tree with reference to the script file acquired by the definition file acquiring unit 84. This manages the correspondence between the source tree and the destination tree. The definition file generating unit 86 offers a graphical user interface which allows the user to generate a definition file.

The VC unit 80 monitors the connection between the source tree and the destination tree. Upon reception of an editing instruction from the user via a user interface provided by a plug-in that handles a display function, the VC unit 80 first modifies a relevant node of the source tree. As a result, the DOM unit 30 issues a mutation event indicating that the source tree has been modified. Upon reception of the mutation event thus issued, the VC unit 80 modifies a node of the destination tree corresponding to the modified node, thereby updating the destination tree in a manner that synchronizes with the modification of the source tree. Upon reception of a mutation event that indicates that the destination tree has been modified, a plug-in having functions of displaying/editing the destination tree, e.g., the HTML unit 50, updates a display with reference to the destination tree thus modified. Such a structure allows a document described in any vocabulary, even a minor vocabulary used in a minor user segment, to be converted into a document described in another major vocabulary. This enables such a document described in a minor vocabulary to be displayed, and provides an editing environment for such a document.

An operation in which the document processing apparatus 20 displays and/or edits documents will be described herein below. When the document processing apparatus 20 loads a document to be processed, the DOM builder 34 generates a DOM tree from the XML document. The main control unit 22 or the editing unit 24 determines which vocabulary describes the XML document by referring to a name space of the XML document to be processed. If the plug-in corresponding to the vocabulary is installed in the document processing apparatus 20, the plug-in is loaded so as to display/edit the document. If, on the other hand, the plug-in is not installed in the document processing apparatus 20, a check shall be made to see whether a mapping definition file exists or not. And if the definition file exits, the definition file acquiring unit 84 acquires the definition file and generates a destination tree according to the definition, so that the document is displayed/edited by the plug-in corresponding to the vocabulary which is to be used for mapping. If the document is a compound document containing a plurality of vocabularies, relevant portions of the document are displayed/edited by plug-ins corresponding to the respective vocabularies, as will be described later. If the definition file does not exist, a source or tree structure of a document is displayed and the editing is carried out on the display screen.

FIG. 2 shows an example of an XML document to be processed. According to this exemplary illustration, the XML document is used to manage data concerning grades or marks that students have earned. A component "marks", which is the top node of the XML document, includes a plurality of components "student" provided for each student under "marks". The component "student" has an attribute "name" and contains, as child elements, the subjects "japanese", "mathematics", "science", and "social_studies". The attribute "name" stores the name of a student. The components "japanese", "mathematics", "science" and "social_studies" store the test scores for the subjects Japanese, mathematics, science, and social studies, respectively. For example, the marks of a student whose name is "A" are "90" for Japanese, "50" for mathematics, "75" for science and "60" for social studies. Hereinafter, the vocabulary (tag set) used in this document will be called "marks managing vocabulary".

Here, the document processing apparatus 20 according to the background technique does not have a plug-in which conforms to or handles the display/editing of marks managing vocabularies. Accordingly, before displaying such a document in a manner other than the source display manner or the tree display manner, the above-described VC function is used. That is, there is a need to prepare a definition file for mapping the document, which has been described in the marks managing vocabulary, to another vocabulary, which is supported by a corresponding plug-in, e.g., HTML or SVG. Note that description will be made later regarding a user interface that allows the user to create the user's own definition file. Now, description will be made below regarding a case in which a definition file has already been prepared.

Figure 3:
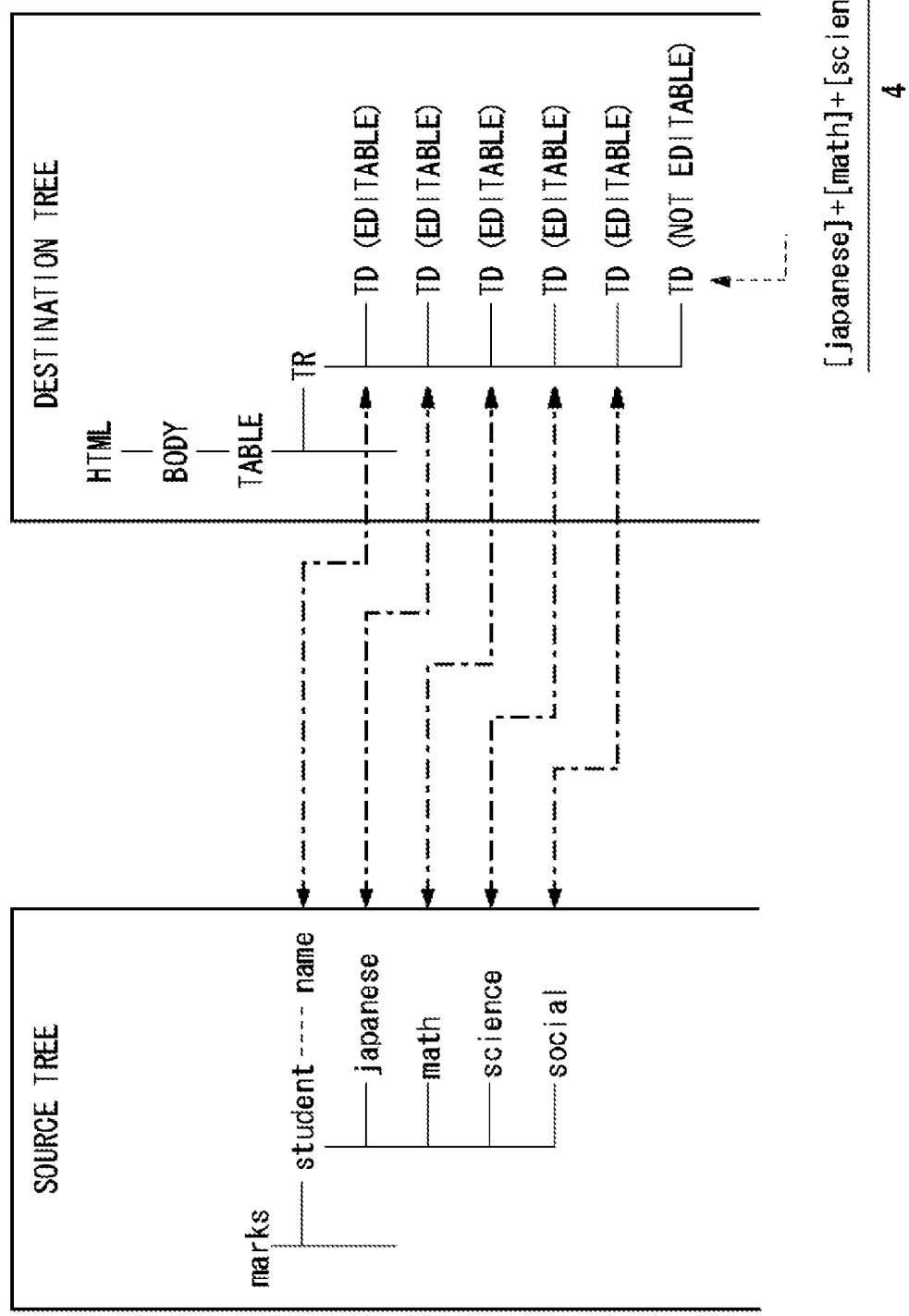
FIG. 3 is a diagram which shows an example in which the XML document shown in FIG. 2 is mapped to a table described in HTML.

FIG. 3 shows an example in which the XML document shown in FIG. 2 is mapped to a table described in HTML. In an example shown in FIG. 3, a "student" node in the marks managing vocabulary is associated with a row ("TR" node) of a table ("TABLE" node) in HTML. The first column in each row corresponds to an attribute value "name", the second column to a "japanese" node element value, the third column to a "mathematics" node element value, the fourth column to a "science" node element value and the fifth column to a "social_studies" node element value. As a result, the XML document shown in FIG. 2 can be displayed in an HTML tabular format. Furthermore, these attribute values and element values are designated as being editable, so that the user can edit these values on a display screen using an editing function of the HTML unit 50. In the sixth column, an operation expression is designated for calculating a weighted average of the marks for Japanese, mathematics, science and social studies, and average values of the marks for each student are displayed. In this manner, more flexible display can be effected by making it possible to specify the operation expression in the definition file, thus improving the users' convenience at the time of editing. In this example shown in FIG. 3, editing is designated as not being possible in the sixth column, so that the average value alone cannot be edited individually. Thus, in the mapping definition it is possible to specify editing or no editing so as to protect the users against the possibility of performing erroneous operations.

FIG. 4(*a*) and FIG. 4(*b*) illustrate an example of a definition file to map the XML document shown in FIG. 2 to the table shown in FIG. 3. This definition file is described in script language defined for use with definition files. In the definition file, definitions of commands and templates for display are described. In the example shown in FIG. 4(*a*) and FIG. 4(*b*), "add student" and "delete student" are defined as commands, and an operation of inserting a node "student" into a source tree and an operation of deleting the node "student" from the source tree, respectively, are associated with these commands. Furthermore, the definition file is described in the form of a template, which describes that a header, such as "name" and "japanese", is displayed in the first row of a table and the contents of the node "student" are displayed in the second and subsequent rows. In the template displaying the contents of the node "student", a term containing "text-of" indicates that editing is permitted, whereas a term containing "value-of" indicates that editing is not permitted. Among the rows where the contents of the node "student" are displayed, an operation expression "(src:japanese+src:mathematics+scr:science+scr:social_studies) div 4" is described in the sixth row. This means that the average of the student's marks is displayed.]

FIG. 5 shows an example of a display screen on which an XML document described in the marks managing vocabulary shown in FIG. 2 is displayed by mapping the XML document to HTML using the correspondence shown in FIG. 3. Displayed from left to right in each row of a table 90 are the name of each student, marks for Japanese, marks for mathematics, marks for science, marks for social studies and the averages thereof. The user can edit the XML document on this screen. For example, when the value in the second row and the third column is changed to "70", the element value in the source tree corresponding to this node, that is, the marks of student "B" for mathematics are changed to "70". At this time, in order to have the destination tree follow the source tree, the VC unit 80 changes a relevant portion of the destination tree accordingly, so that the HTML unit 50 updates the display based on the destination tree thus changed. Hence, the marks of student "B" for mathematics are changed to "70", and the average is changed to "55" in the table on the screen.

On the screen as shown in FIG. 5, commands like "add student" and "delete student" are displayed in a menu as defined in the definition file shown in FIG. 4(*a*) and FIG. 4(*b*). When the user selects a command from among these commands, a node "student" is added or deleted in the source tree. In this manner, with the document processing apparatus 20 according to the background technique, it is possible not only to edit the element values of components in a lower end of a hierarchical structure but also to edit the hierarchical structure. An edit function for editing such a tree structure may be presented to the user in the form of commands. Furthermore, a command to add or delete rows of a table may, for example, be linked to an operation of adding or deleting the node "student". A command to embed other vocabularies therein may be presented to the user. This table may be used as an input template, so that marks data for new students can be added in a fill-in-the-blank format. As described above, the VC function allows a document described in the marks managing vocabulary to be edited using the display/editing function of the HTML unit 50.

Figure 6:
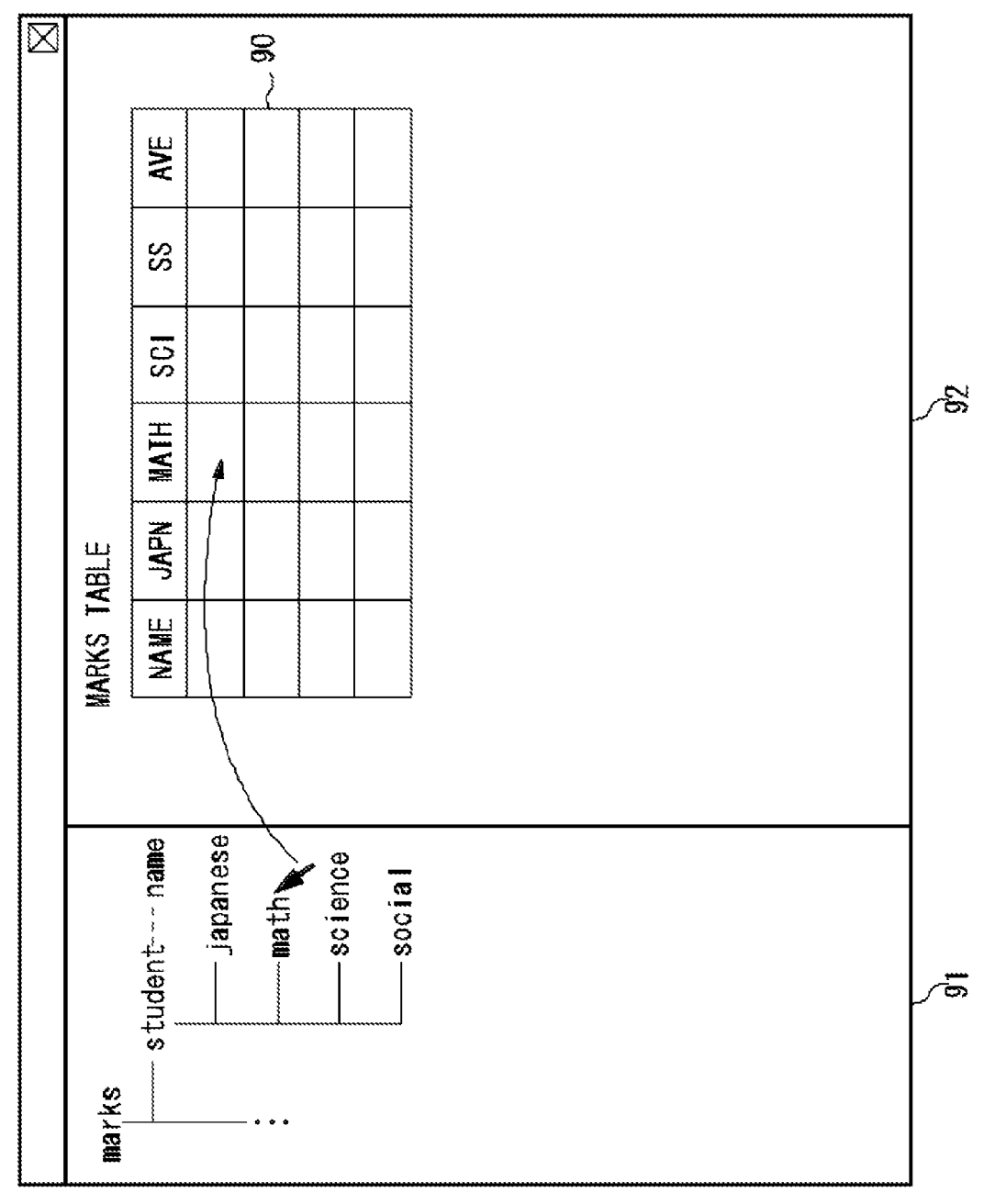

FIG. 6 shows an example of a graphical user interface, which the definition file generating unit 86 presents to the user, in order for the user to generate a definition file. An XML document to be mapped is displayed in a tree in a left-hand area 91 of a screen. The screen layout of an XML document after mapping is displayed in a right-hand area 92 of the screen. This screen layout can be edited by the HTML unit 50, and the user creates a screen layout for displaying documents in the right-hand area 92 of the screen. For example, a node of the XML document which is to be mapped, which is displayed in the left-hand area 91 of the screen, is dragged and dropped into the HTML screen layout in the right-hand area 92 of the screen using a pointing device such as a mouse, so that a connection between a node at a mapping source and a node at a mapping destination is specified. For example, when "mathematics," which is a child element of the element "student," is dropped to the intersection of the first row and the third column in a table 90 on the HTML screen, a connection is established between the "mathematics" node and a "TD" node in the third column. Either editing or no editing can be specified for each node. Moreover, the operation expression can be embedded in a display screen. When the screen editing is completed, the definition file generating unit 86 generates definition files, which describe connections between the screen layout and nodes.

Viewers or editors which can handle major vocabularies such as XHTML, MathML and SVG have already been developed. However, it does not serve any practical purpose to develop dedicated viewers or editors for such documents described in the original vocabularies as shown in FIG. 2. If, however, the definition files for mapping to other vocabularies are created as mentioned above, the documents described in the original vocabularies can be displayed and/or edited utilizing the VC function without the need to develop a new viewer or editor.

Figure 7:
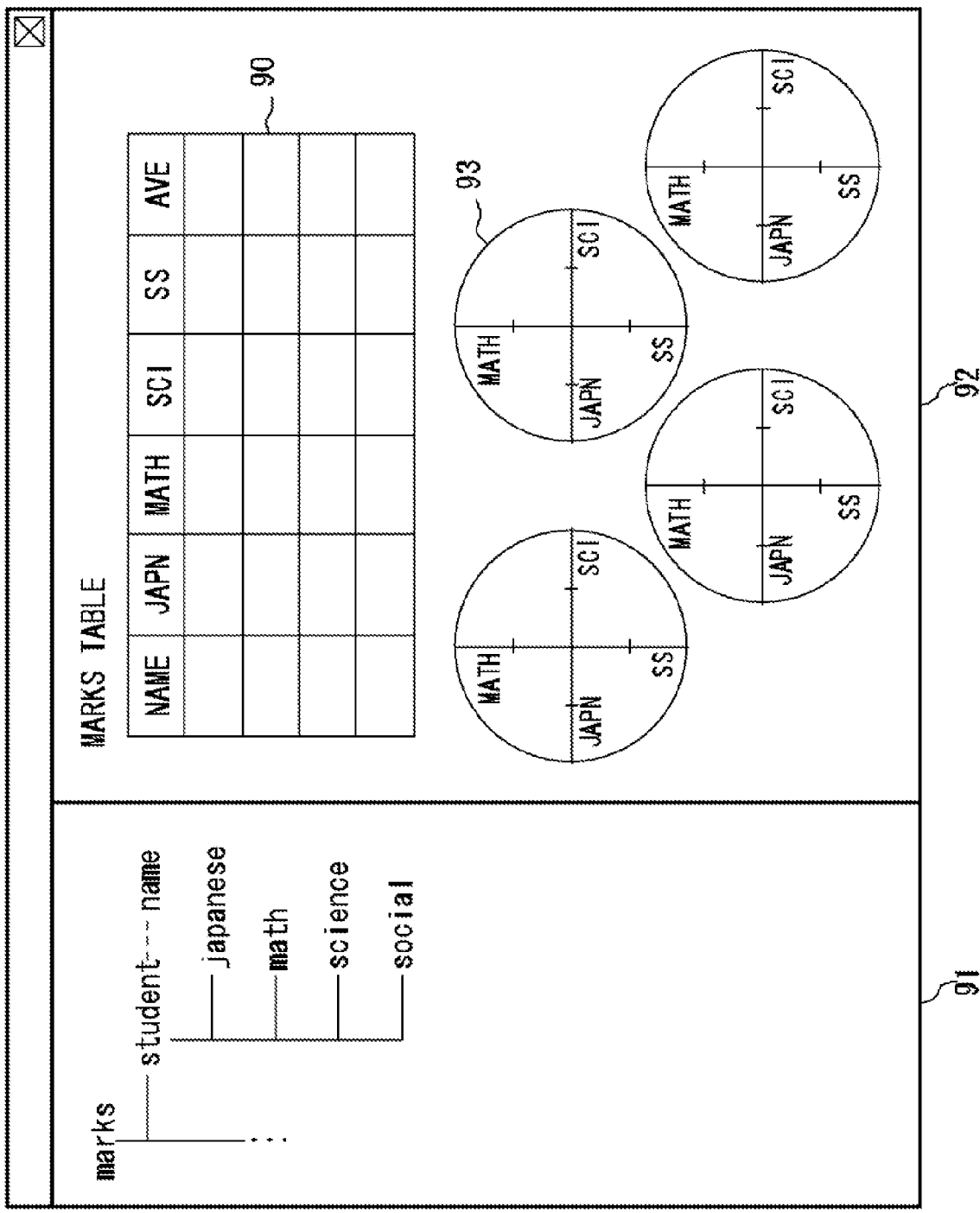
FIG. 7 is a diagram which shows another example of a screen layout created by the definition file generating unit.

FIG. 7 shows another example of a screen layout generated by the definition file generating unit 86. In the example shown in FIG. 7, a table 90 and circular graphs 93 are created on a screen for displaying XML documents described in the marks managing vocabulary. The circular graphs 93 are described in SVG. As will be discussed later, the document processing apparatus 20 according to the background technique can process a compound document described in the form of a single XML document according to a plurality of vocabularies. That is why the table 90 described in HTML and the circular graphs 93 described in SVG can be displayed on the same screen.

FIG. 8 shows an example of a display medium, which in a preferred but non-limiting embodiment is an edit screen, for XML documents processed by the document processing apparatus 20. In the example shown in FIG. 8, a single screen is partitioned into a plurality of areas and the XML document to be processed is displayed in a plurality of different display formats at the respective areas. The source of the document is displayed in an area 94, the tree structure of the document is displayed in an area 95, and the table shown in FIG. 5 and described in HTML is displayed in an area 96. The document can be edited in any of these areas, and when the user edits content in any of these areas, the source tree will be modified accordingly, and then each plug-in that handles the corresponding screen display updates the screen so as to effect the modification of the source tree. Specifically, display units of the plug-ins in charge of displaying the respective edit screens are registered in advance as listeners for mutation events that provide notice of a change in the source tree. When the source tree is modified by any of the plug-ins or the VC unit 80, all the display units, which are displaying the edit screen, receive the issued mutation event(s) and then update the screens. At this time, if the plug-in is executing the display through the VC function, the VC unit 80 modifies the destination tree following the modification of the source tree. Thereafter, the display unit of the plug-in modifies the screen by referring to the destination tree thus modified.

For example, when the source display and tree-view display are implemented by dedicated plug-ins, the source-display plug-in and the tree-display plug-in execute their respective displays by directly referring to the source tree without involving the destination tree. In this case, when the editing is done in any area of the screen, the source-display plug-in and the tree-display plug-in update the screen by referring to the modified source tree. Also, the HTML unit 50 in charge of displaying the area 96 updates the screen by referring to the destination tree, which has been modified following the modification of the source tree.

The source display and the tree-view display can also be realized by utilizing the VC function. That is to say, an arrangement may be made in which the source and the tree structure are laid out in HTML, an XML document is mapped to the HTML structure thus laid out, and the HTML unit 50 displays the XML document thus mapped. In such an arrangement, three destination trees in the source format, the tree format and the table format are generated. If the editing is carried out in any of the three areas on the screen, the VC unit 80 modifies the source tree and, thereafter, modifies the three destination trees in the source format, the tree format and the table format. Then, the HTML unit 50 updates the three areas of the screen by referring to the three destination trees.

In this manner, a document is displayed on a single screen in a plurality of display formats, thus improving a user's convenience. For example, the user can display and edit a document in a visually easy-to-understand format using the table 90 or the like while understanding the hierarchical structure of the document by the source display or the tree display. In the above example, a single screen is partitioned into a plurality of display formats, and they are displayed simultaneously. Also, a single display format may be displayed on a single screen so that the display format can be switched according to the user's instructions. In this case, the main control unit 22 receives from the user a request for switching the display format and then instructs the respective plug-ins to switch the display.

Figure 10:
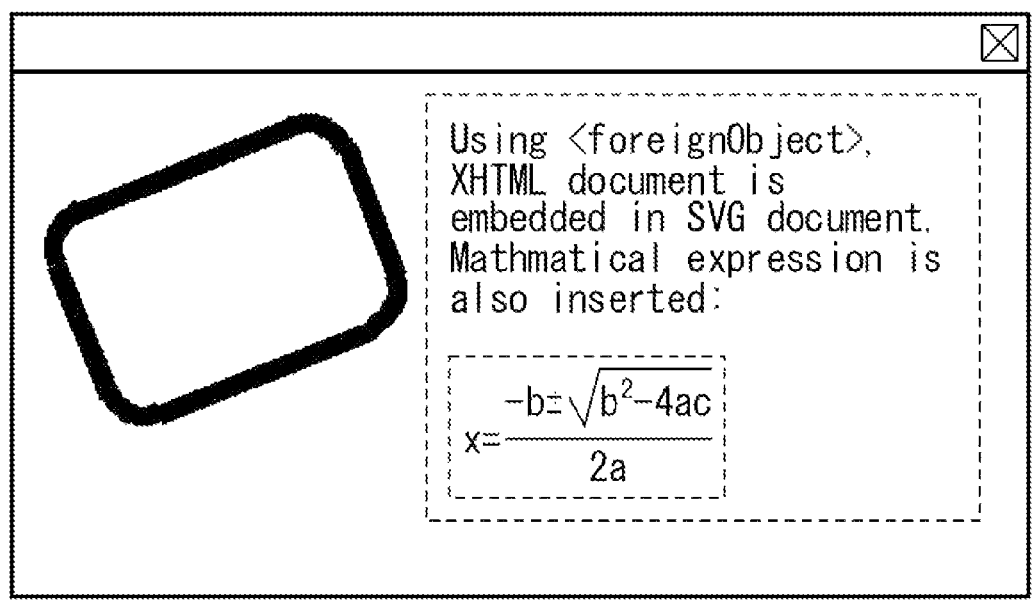
FIG. 10 is a diagram which shows an example of a screen on which the document shown in FIG. 9 is displayed.

FIG. 9 illustrates another example of an XML document edited by the document processing apparatus 20. In the XML document shown in FIG. 9, an XHTML document is embedded in a "foreignObject" tag of an SVG document, and the XHTML document contains an equation described in MathML. In this case, the editing unit 24 assigns the rendering job to an appropriate display system by referring to the name space. In the example illustrated in FIG. 9, first, the editing unit 24 instructs the SVG unit 60 to render a rectangle, and then instructs the HTML unit 50 to render the XHTML document. Furthermore, the editing unit 24 instructs a MathML unit (not shown) to render an equation. In this manner, the compound document containing a plurality of vocabularies is appropriately displayed. FIG. 10 illustrates the resulting display.

The displayed menu may be switched corresponding to the position of the cursor (carriage) during the editing of a document. That is, when the cursor lies in an area where an SVG document is displayed, the menu provided by the SVG unit 60, or a command set which is defined in the definition file for mapping the SVG document, is displayed. On the other hand, when the cursor lies in an area where the XHTML document is displayed, the menu provided by the HTML unit 50, or a command set which is defined in the definition file for mapping the HTML document, is displayed. Thus, an appropriate user interface can be presented according to the editing position.

In a case that there is neither a plug-in nor a mapping definition file suitable for any one of the vocabularies according to which the compound document has been described, a portion described in this vocabulary may be displayed in source or in tree format. In the conventional practice, when a compound document is to be opened where another document is embedded in a particular document, their contents cannot be displayed without the installation of an application to display the embedded document. According to the background technique, however, the XML documents, which are composed of text data, may be displayed in source or in tree format so that the contents of the documents can be ascertained. This is a characteristic of the text-based XML documents or the like.

Another advantageous aspect of the data being described in a text-based language, for example, is that, in a single compound document, a part of the compound document described in a given vocabulary can be used as reference data for another part of the same compound document described in a different vocabulary. Furthermore, when a search is made within the document, a character string of characters embedded in a drawing, such as SVG, may also be search candidates.

In a document described in a particular vocabulary, tags belonging to other vocabularies may be used. Though such an XML document is generally not valid, it can be processed as a valid XML document as long as it is well-formed. In such a case, the tags thus inserted that belong to other vocabularies may be mapped using a definition file. For instance, tags such as "Important" and "Most Important" may be used so as to display a portion surrounding these tags in an emphasized manner, or may be sorted out in the order of importance.

When the user edits a document on an edit screen as shown in FIG. 10, a plug-in or a VC unit 80, which is in charge of processing the edited portion, modifies the source tree. A listener for mutation events can be registered for each node in the source tree. Normally, a display unit of the plug-in or the VC unit 80 conforming to a vocabulary that belongs to each node is registered as the listener. When the source tree is modified, the DOM provider 32 traces toward a higher hierarchy from the modified node. If there is a registered listener, the DOM provider 32 issues a mutation event to the listener. For example, referring to the document shown in FIG. 9, if a node which lies lower than the <html> node is modified, the mutation event is notified to the HTML unit 50, which is registered as a listener to the <html> node. At the same time, the mutation event is also notified to the SVG unit 60, which is registered as a listener in an <svg> node, which lies upper to the <html> node. At this time, the HTML unit 50 updates the display by referring to the modified source tree. Since the nodes belonging to the vocabulary of the SVG unit 60 itself are not modified, the SVG unit 60 may disregard the mutation event.

Depending on the contents of the editing, modification of the display by the HTML unit 50 may change the overall layout. In such a case, the layout is updated by a screen layout management mechanism, e.g., the plug-in that handles the display of the highest node, in increments of display regions which are displayed according to the respective plug-ins. For example, in a case of expanding a display region managed by the HTML unit 50, first, the HTML unit 50 renders a part managed by the HTML unit 50 itself, and determines the size of the display region. Then, the size of the display area is notified to the component that manages the screen layout so as to request the updating of the layout. Upon receipt of this notice, the component that manages the screen layout rebuilds the layout of the display area for each plug-in. Accordingly, the display of the edited portion is appropriately updated and the overall screen layout is updated.

Based on the background technique as described above, an embodiment will now be described below in detail.

Embodiment

A document creating apparatus and a document reading apparatus in this embodiment are configured on the basis of the aforementioned background technique. The document processing apparatus 20 in the background technique is basically considered to be included in a part of the document creating apparatus and the document reading apparatus in this embodiment. Also, the present embodiment mainly describes an example of processing an XML-structured document file representing a structured document.

Figure 11:
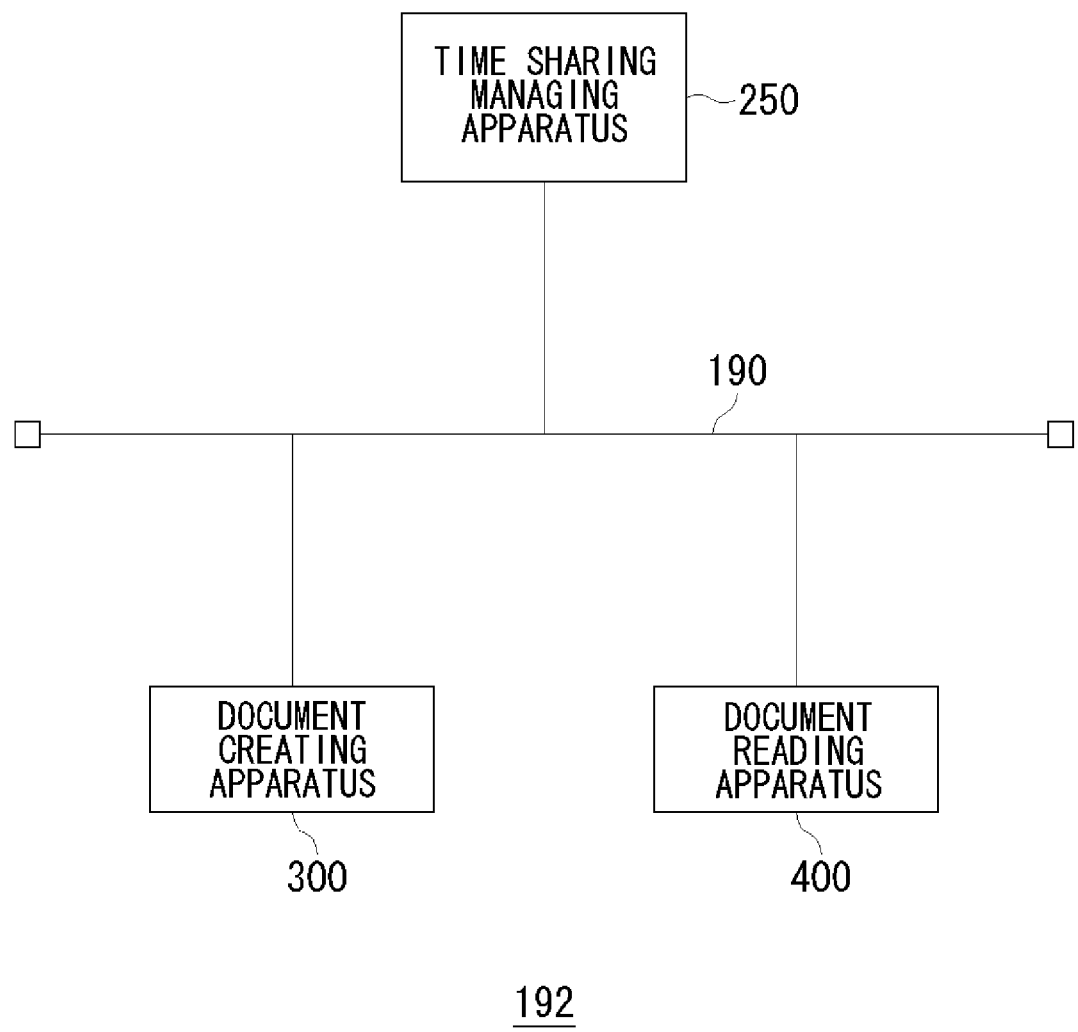
FIG. 11 is a hardware configuration diagram of a document managing system.

FIG. 11 is a hardware configuration diagram of a document managing system 192. To a local area network (LAN) 190 are connected a time sharing managing apparatus 250, a document creating apparatus 300 and a document reading apparatus 400.

A document creator creates document files with the document creating apparatus 300. A document reader views created document files on the document reading apparatus 400. Document files created by document creators may be stored in a database (not illustrated) that connects to the time sharing managing apparatus 250 or the LAN 190. The present embodiment describes a case where document files created by document creators are transmitted from the document creating apparatus 300 to the document reading apparatus 400.

Document files dealt with herein include time information. For instance, a document creator may transmits to the document reading apparatus 400 a document file, in which answering a questionnaire is required with a due date of "June 7". Here, time-related information represented by the character string "June 7" is called "time information". The time sharing managing apparatus 250 collectively manages the time information between the document creating apparatus 300 and the document reading apparatus 400.

The process performed by the document managing system 192 will be outlined below.

Time information specified by a document creator as a content of a document file is transmitted from the document creating apparatus 300 to the time sharing managing apparatus 250. The time sharing managing apparatus 250 sets a time ID for the time information received from the document creating apparatus 300. The time ID is an ID for identifying time information in the document managing system 192. For the time information "June 7" which appeared in the document file in the aforementioned example, a time ID "0014", for instance, may be set. Hereinafter, a time ID as set in this manner is called "specification time ID" so as to distinguish it from a time ID for certifying time, which is hereinafter called "certification time ID" and will be discussed later. When specification time IDs and certification time IDs are collectively meant, they are simply called "time IDs".

The specification time ID is not an ID for identifying the time itself. This ID is set for each time information specified in a certain position in a certain document file. For example, if the same time information of "June 7" happens to appear in another document file, a different specification time ID other than "0014" will be assigned to the time information. Further, even if the time information "June 7" to which the specification time ID "0014" has been assigned is changed to another date, the specification time ID itself will remain unchanged.

The format of the time ID may vary according to the time unit, such as day, hour, minute or second. For instance, the prefix of the time ID may be changed according to the time unit, such as "D0014" for a day-based time ID, "H0014" for an hour-based time ID, and "M0014" for a minute-based time ID.

Upon receiving a specification time ID from the time sharing managing apparatus 250, the document creating apparatus 300 adds the specification time ID to the document file. For example, an XML tag of a predefined format, such as <SPECTIME ID="0014">, may be added for the time information. Or the document creating apparatus 300 may replace the time information itself included in the document file with a character string that represents the specification time ID. Then, the document creating apparatus 300 transmits to the document reading apparatus 400 the document file to which the specification time ID has been added. Hereinafter, a document file with a time ID added thereto is called "ID-added document file".

The document reading apparatus 400 detects a specification time ID that has been added to an ID-added document file. The document reading apparatus 400 then inquires of the time sharing managing apparatus 250 for time information corresponding to the specification time ID. The time sharing managing apparatus 250 transmits the corresponding time information to the document reading apparatus 400. In this case, the document reading apparatus 400 transmits the specification time ID "0014" to the time sharing managing apparatus 250, thereby acquiring the time information "June 7". Then, the document reading apparatus 400 inserts a character string representing the time information in the position where the specification time ID has been added in the ID-added document file and displays the document on the screen. Hereinafter, an ID-added document file into which the document reading apparatus 400 has inserted time information received from the time sharing managing apparatus 250 is called "restored document file".

When a document creator changes time information in the document creating apparatus 300, the time sharing managing apparatus 250 also updates the time information. For example, it will be assumed that a document creator sets the time information of "June 7" and the time sharing managing apparatus 250 assigns the specification time ID of "0014" to it. In this case, if the document creator changes the time information in the file from "June 7" to "June 10", the document creating apparatus 300 will notify the time sharing managing apparatus 250 of the change. The time sharing managing apparatus 250 will then change the time information corresponding to the specification time ID "0014" from "June 7" to "June 10". When a document reader opens a document file that was previously received from the document creating apparatus 300 and has been saved in the document reading apparatus 400, the document reading apparatus 400 requests from the time sharing managing apparatus 250 the time information corresponding to the specification time ID in the document file. Consequently, each time a document reader opens a document file, time information in the document file is updated to the latest.

Therefore, a problem whereby a document reader may fail to be notified of a change in time information due to the document creator's neglecting to give notice of the change, as described in the problem (1), is less likely to occur. This is because, once the document reading apparatus 400 receives a document file, the time information therein is appropriately updated to the latest.

A document reader can copy a specification time ID in a document file, which was transmitted from the document creating apparatus 300, into another document file. If the document file into which a copy is to be made is an XML document, an XML tag, such as <SPECTIME ID="0014"> as mentioned previously, may be added to the document file. When opening a document file having a specification time ID copied therein, the document reading apparatus 400 acquires time information corresponding to the specification time ID from the time sharing managing apparatus 250. Thus, when a document creator changes time information in a document file, the time information in various files of a document reader is also updated accordingly. Therefore, a problem that arises in changing a document file, whereby document readers bear the burden of inputting so as to reflect the changes in their own files, as described in the problem (2), could be completely eliminated.

In another aspect, the document creating apparatus 300 can request from the time sharing managing apparatus 250 the current time and the issuance of a certification time ID corresponding to the current time. The time sharing managing apparatus 250 measures the current time, generates a corresponding certification time ID and transmits it to the document creating apparatus 300. Then, the document creating apparatus 300 adds the certification time ID to the document file and transmits it to the document reading apparatus 400. Also in this case, an XML tag of a predefined format, such as <CERTTIME ID="6016">, may be added to the target time information.

The document reading apparatus 400 detects a certification time ID included in a document file received. Then, said apparatus inquires of the time sharing managing apparatus 250 for the corresponding time information. Between a document reader and a document creator, perception of time does not always agree due to time difference, difference in setting clocks, etc. According to this aspect, however, the time when a document file was created is collectively managed by the time sharing managing apparatus 250. As a result, the document reading apparatus 400 accurately recognizes the creation time of the document file, resulting in the problem (3) being solved. Hereinafter, time measured by the time sharing managing apparatus 250 when the document creating apparatus 300 requests the time sharing managing apparatus 250 to issue a certification time ID so as to certify the time is called "certification time".

The time sharing managing apparatus 250 may double as the function of the document creating apparatus 300. In such a case, a document creator creates a document file by the time sharing managing apparatus 250 and transmits it to the document reading apparatus 400. Also, the document creating apparatus 300 and the document reading apparatus 400 may appropriately exchange their functions. In other words, the document creating apparatus 300 or the document reading apparatus 400 may not necessarily be a dedicated apparatus that performs each function. A user may use an apparatus with a platform of the document processing apparatus 20 as the document creating apparatus 300 to create document files or may use it as the document reading apparatus 400 to read document files. In the present embodiment, the time sharing managing apparatus 250, the document creating apparatus 300, and the document reading apparatus 400 are described as separate apparatuses.

Figure 12:
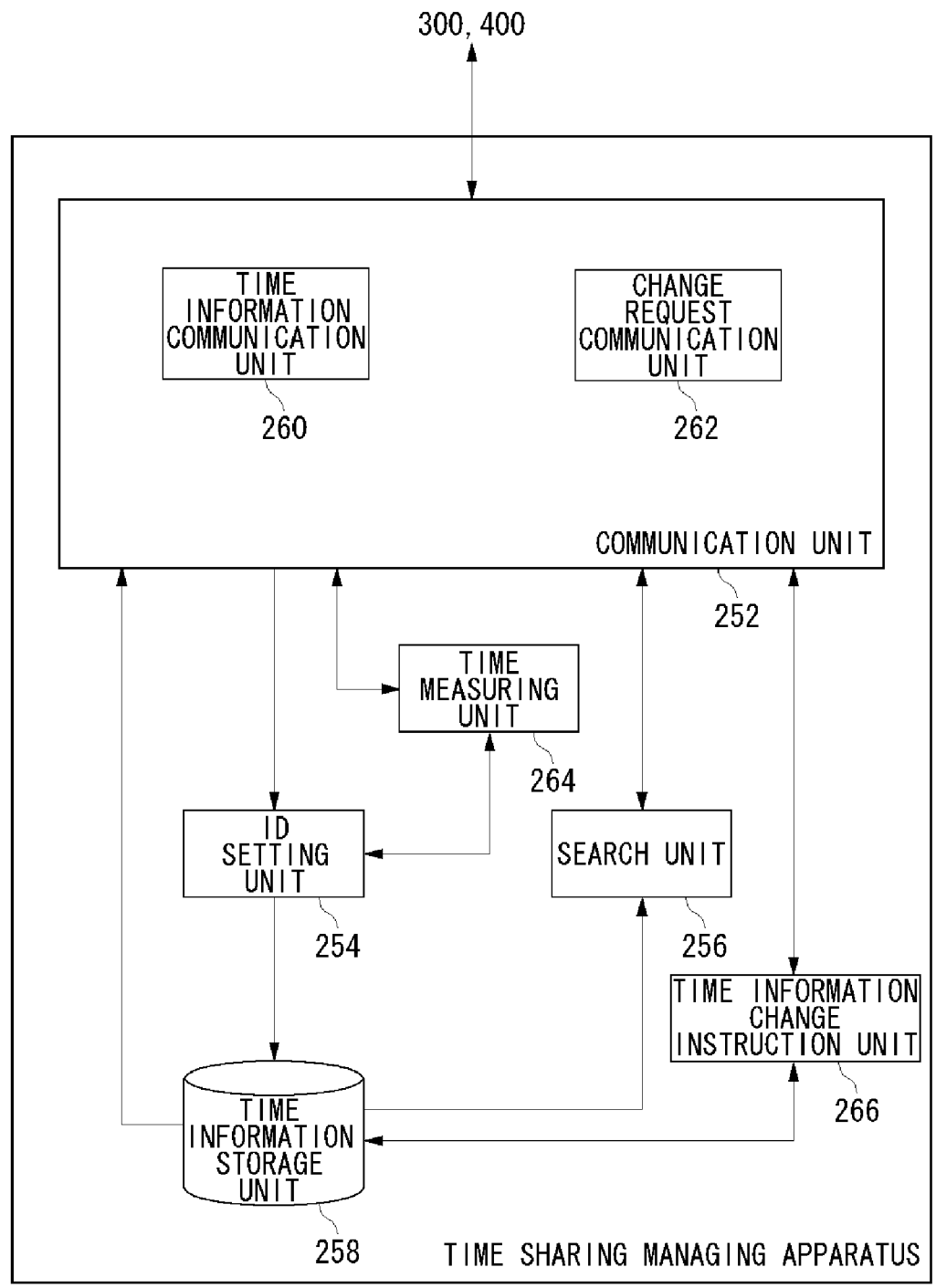
FIG. 12 is a functional block diagram of a time sharing managing apparatus.

FIG. 12 shows a functional block diagram of the time sharing managing apparatus 250.

Figure 13:
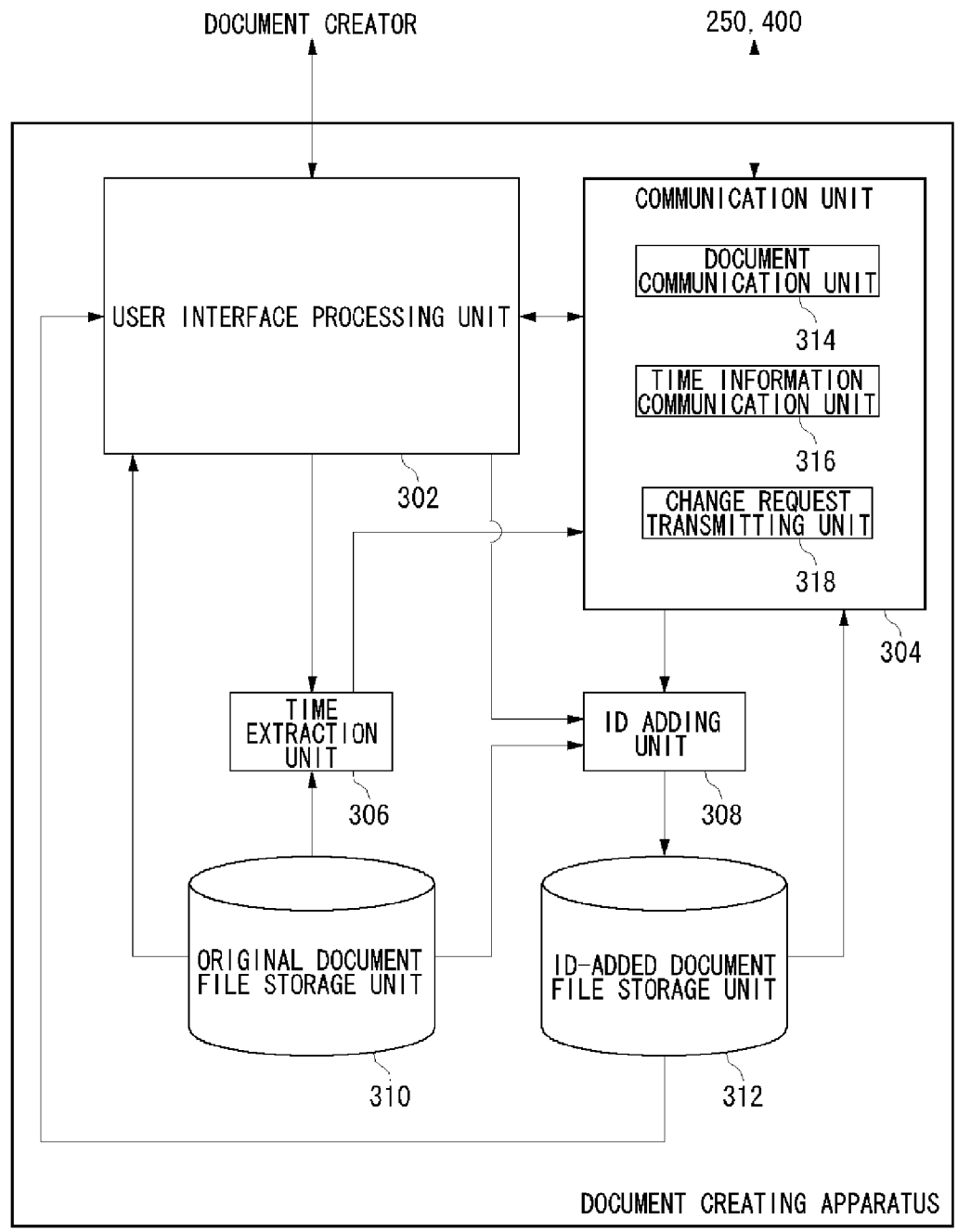
FIG. 13 is a functional block diagram of a document creating apparatus.
Figure 14:
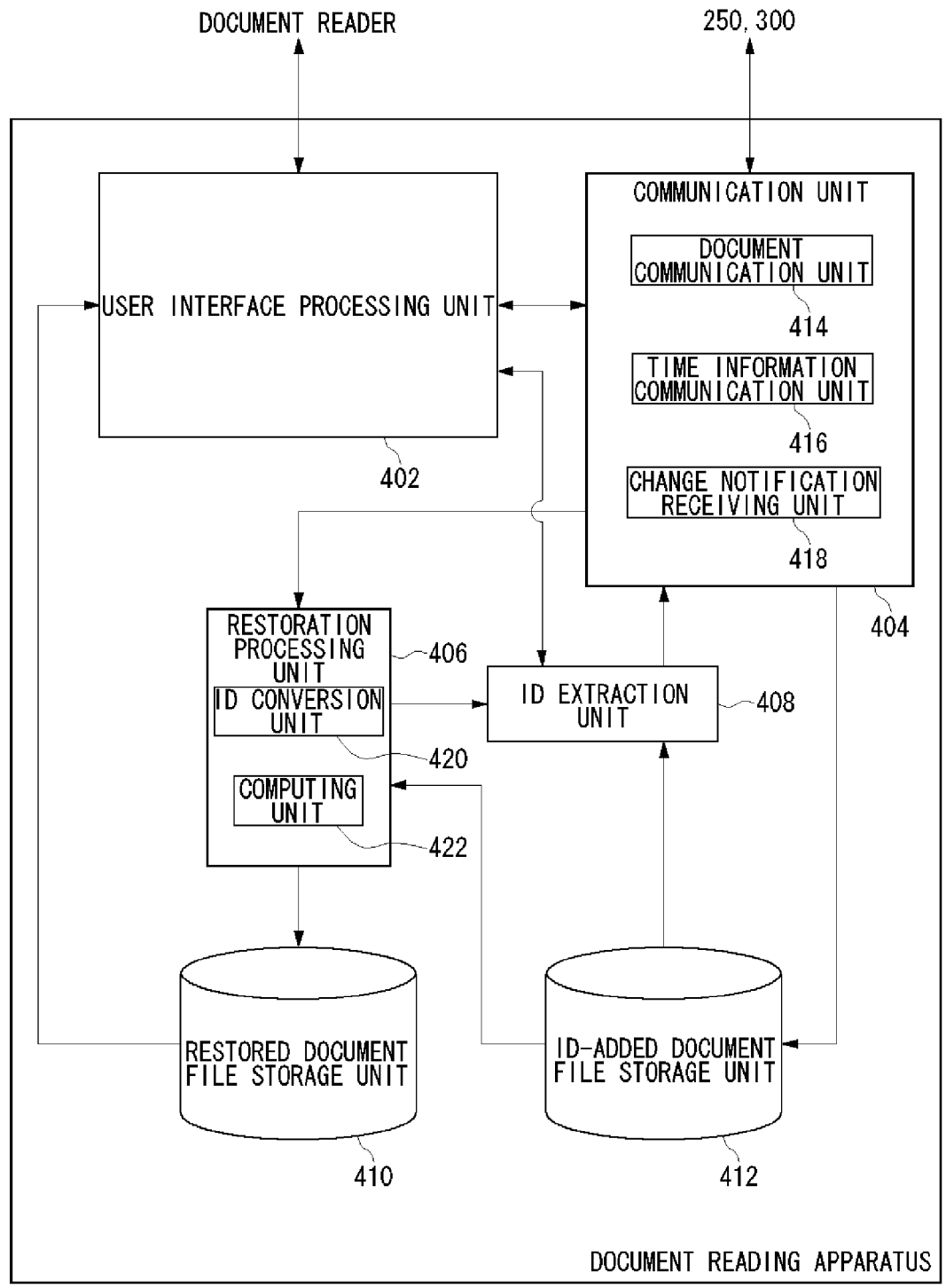
FIG. 14 is a functional block diagram of a document reading apparatus.

The time sharing managing apparatus 250, the document creating apparatus 300 which will be described in association with FIG. 13, or the document reading apparatus 400 which will be described in association with FIG. 14 can be achieved by an element such as a CPU of a computer in terms of hardware and by various program modules in terms of software. FIGS. 12 through 14 described below illustrate functional blocks achieved by the cooperation of those components. Hence, these functional blocks can be realized in a variety of forms by combinations of hardware and software.

The time sharing managing apparatus 250 comprises a communication unit 252, an ID setting unit 254, a search unit 256, a time information storage unit 258, a time measuring unit 264 and a time information change instruction unit 266.

The communication unit 252 handles the overall communication with the document creating apparatus 300 or the document reading apparatus 400. The communication unit 252 includes a time information communication unit 260 and a change request communication unit 262.

The time information communication unit 260 transmits to or receives from the document creating apparatus 300 or the document reading apparatus 400 the time information and time IDs.

More specifically, the time information communication unit 260 receives from the document creating apparatus 300 the information on a request for the issuance of a specification time ID (hereinafter referred to as "specification time ID request information"). Then, the ID setting unit 254 sets a specification time ID that corresponds to the time information included in the specification time ID request information. The time information communication unit 260 transmits the specification time ID, as set by the ID setting unit 254, to the document creating apparatus 300 which transmitted the specification time ID request information. The ID setting unit 254 relates the time information to the specification time ID correspondingly assigned thereto and records them in the time information storage unit 258.

Also, the time information communication unit 260 receives from the document creating apparatus 300 the information on a request for the certification time and the issuance of a certification time ID corresponding to the certification time (hereinafter referred to as "certification time ID request information"). The time measuring unit 264 measures the current time and generates time information corresponding to the certification time. The ID setting unit 254 sets a certification time ID for the time information generated by the time measuring unit 264. The time information communication unit 260 transmits the certification time ID, as set by the ID setting unit 254, to the document creating apparatus 300 which transmitted the certification time ID request information. The ID setting unit 254 relates the time information to the certification time ID correspondingly assigned thereto and records them in the time information storage unit 258.

With regard to setting time IDs, the ID setting unit 254 separately stores ID numbers already in use and those not in use and assigns a new time ID from unused ID numbers so that time IDs uniquely identify time information. Alternatively, the ID setting unit 254 may randomly select a natural number as a time ID from among a sufficiently large group of natural numbers.

Further, the time information communication unit 260 receives from the document reading apparatus 400 the information on inquiry for time information (hereinafter referred to as "time request information"). Time request information includes a time ID that is to be the subject of inquiry. When the time information communication unit 260 receives time request information, the search unit 256 finds time information corresponding to the time ID from the time information storage unit 258. The time information communication unit 260 then transmits the time information found by the search unit 256 to the document reading apparatus 400, which transmitted the time request information.

The change request communication unit 262 receives from the document creating apparatus 300 a notification of change of time information (hereinafter referred to as "time change information"). The document creating apparatus 300 may appropriately change time information even though the information already has a specification time ID issued by the time sharing managing apparatus 250. In such a case, the document creating apparatus 300 transmits time change information to the time sharing managing apparatus 250. Time change information includes a specification time ID and time information as changed. When the change request communication unit 262 receives time change information, the time information change instruction unit 266 re-relates the specification time ID to the changed time information and records them in the time information storage unit 258. Thereafter, the change request communication unit 262 notifies the document reading apparatus 400 of the change in the time information.

FIG. 13 shows a functional block diagram of the document creating apparatus 300.

The document creating apparatus 300 comprises a user interface processing unit 302, a communication unit 304, a time extraction unit 306, an ID adding unit 308, an original document file storage unit 310 and an ID-added document file storage unit 312.

The user interface processing unit 302 handles user interface process for a document creator. Specifically, the user interface processing unit 302 receives data inputs from a document creator while displaying a document file on the screen. The communication unit 304 handles the overall communication process with the time sharing managing apparatus 250 or the document reading apparatus 400. The original document file storage unit 310 stores document files created by a document creator, which include time information. Hereinafter, a document file created by a document creator is called "original document file" so as to distinguish it from an ID-added document file to which a time ID has been added. When original document files and ID-added document files are collectively meant, they are simply called "document files".

The time extraction unit 306 extracts time information from an original document file. Time information is described as a character string representing a time or date expressed in a given form, such as "Jun. 7, 2004" or "2004/6/7". The time extraction unit 306 detects such forms in document files to identify and extract time information. Here, the document creator may have specified a character string representing time information. The ID adding unit 308 adds a time ID assigned by the time sharing managing apparatus 250 to the original document file. The ID-added document file storage unit 312 then stores the ID-added document file with the time ID added thereto.

The communication unit 304 comprises a document communication unit 314, a time information communication unit 316 and a change request transmitting unit 318.

The document communication unit 314 transmits an ID-added Document file to the document reading apparatus 400. The time information communication unit 316 transmits specification time ID request information to the time sharing managing apparatus 250. The time information communication unit 316 receives a specification time ID from the time sharing managing apparatus 250. The time information communication unit 316 also transmits certification time ID request information to the time sharing managing apparatus 250. Further, the time information communication unit 316 receives from the time sharing managing apparatus 250 a certification time ID and time information representing a certification time. The ID adding unit 308 adds a certification time ID or a specification time ID to the corresponding part of an original document file so as to generate an ID-added document file. When a document creator changes time information in an ID-added document file, which has been stored in the ID-added document file storage unit 312, via the user interface processing unit 302, the change request transmitting unit 318 transmits time change information to the time sharing managing apparatus 250.

FIG. 14 shows a functional block diagram of the document reading apparatus 400.

The document reading apparatus 400 comprises a user interface processing unit 402, a communication unit 404, a restoration processing unit 406, an ID extraction unit 408, a restored document file storage unit 410 and an ID-added document file storage unit 412.

The user interface processing unit 402 handles user interface process for a document reader. Specifically, the user interface processing unit 402 receives data inputs from a document reader while displaying a document file on the screen. The communication unit 404 handles the overall communication process with the time sharing managing apparatus 250 or the document creating apparatus 300.

The communication unit 404 comprises a document communication unit 414, a time information communication unit 416 and a change notification receiving unit 418. The document communication unit 414 receives an ID-added document file from the document creating apparatus 300. The ID-added document file thus received is stored in the ID-added document file storage unit 412. The time information communication unit 416 transmits time request information to the time sharing managing apparatus 250 and receives time information from the time sharing managing apparatus 250. Upon receiving time information from the time sharing managing apparatus 250, the time information communication unit 416 notifies the restoration processing unit 406 thereof. The change notification receiving unit 418 receives from the change request communication unit 262 of the time sharing managing apparatus 250 a notification that time information in an ID-added document file has been changed.

The ID extraction unit 408 extracts a time ID from an ID-added document file stored in the ID-added document file storage unit 412. The time information communication unit 416 then transmits time request information based on the extracted time ID. The restoration processing unit 406 adds a character string representing the time information received from the time information communication unit 416, to the ID-added document file in the ID-added document file storage unit 412. Thus, the ID-added document file is converted to a document file that includes time information (hereinafter referred to as "restored document file"). The restored document file storage unit 410 then stores the restored document file. As a result, the restored document file is identical in contents with the original document file stored in the original document file storage unit 310.

The restoration processing unit 406 further comprises an ID conversion unit 420 and a computing unit 422. The ID conversion unit 420 replaces a time ID included in an ID-added document file with a character string representing time information received by the time information communication unit 416. Also, an ID-added document file may include an operation expression for time information, as will be discussed in detail next with reference to FIG. 15. The computing unit 422 performs a specified operation for time information. The ID conversion unit 420 then generates time information regarding the time that resulted from the operation. In this case, the ID conversion unit 420 adds to the ID-added document file a character string representing time information that resulted from the operation, which corresponds to the time ID and operation expression included in the ID-added document file.

Figure 15:
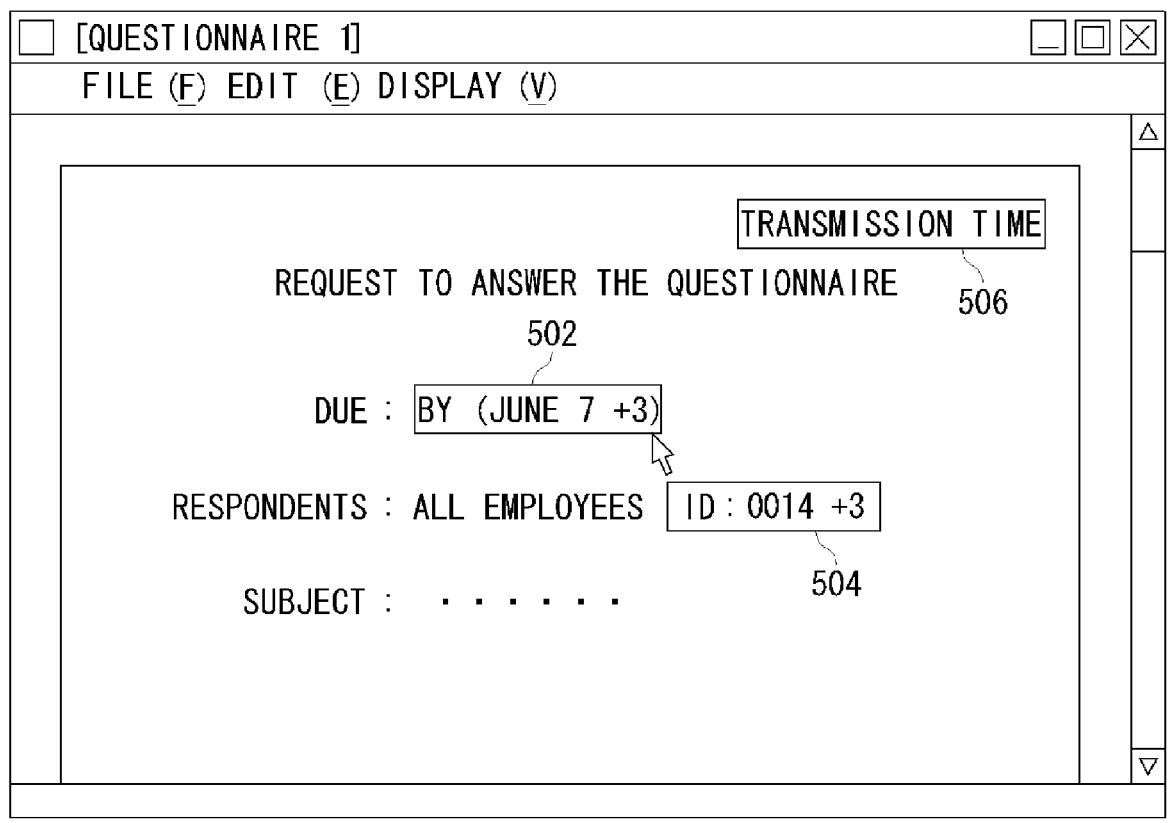
FIG. 15 is a diagram which shows a document creation screen of the document creating apparatus.

FIG. 15 shows a document creation screen 500 of the document creating apparatus 300. Here, a document creator is creating a document file for requesting document readers to answer a questionnaire.

A due date specification area 502 shows the due date of the questionnaire. In FIG. 15, the due date is specified in the form of time information with an operation expression added thereto, i.e. "June 7 +3". Here, "June 7" is time information, and "+3" is an operation expression. The operation expression may be a combination of four arithmetic operations. When a document creator instructs the acquisition of a specification time ID via the user interface processing unit 302, the time information communication unit 316 transmits specification time ID request information to the time sharing managing apparatus 250. After the time information communication unit 260 of the time sharing managing apparatus 250 receives the specification time ID request information, the ID setting unit 254 sets a specification time ID for the specified time information of "June 7".

If the specification time ID is "0014", the time information storage unit 258 of the time sharing managing apparatus 250 will relate the specification time ID "0014" to the time information "June 7" and store them. The time information communication unit 260 then transmits to the document creating apparatus 300 the specification time ID "0014" and the operation expression "+3" as an "operation-added time ID". Hereinafter, the operation-added time ID will be discussed as a special form of a time ID with the extended concept of the time ID. The ID adding unit 308 of the document creating apparatus 300 adds the specification time ID and the operation expression to the due date specification area 502.

When a document creator points the mouse cursor to a character string representing time information in a state where a specification time ID has been added, the specification time ID and operation expression are displayed as a tooltip 504. In FIG. 15, the specification time ID "0014", as set for "June 7", is displayed. Since an operation expression "+3" has been added to this time information, the time ID "0014" is displayed together with "+3".

By the operation as stated above, a time ID is added to an original document file, so that an ID-added document file is generated.

A certification time specification area 506 shows the transmission time of a document file. A document creator inputs a request for a certification time ID in the certification time specification area 506. When the document creator instructs the user interface processing unit 302 to transmit the document file, the time information communication unit 316 transmits certification time ID request information to the time sharing managing apparatus 250 before the file is transmitted. When the time information communication unit 260 receives the certification time ID request information, the time measuring unit 264 measures the current time to generate time information on the certification time. Then, the ID setting unit 254 sets a certification time ID, relates it to the time information, and stores them in the time information storage unit 258. The time information communication unit 260 transmits to the document creating apparatus 300 the time information on the certification time and the certification time ID.

The ID adding unit 308 of the document creating apparatus 300 adds the certification time ID thus received to the certification time specification area 506 in the document file. At this time, a character string representing the certification time may be added to the document file. When the addition of the certification time ID is completed, the document communication unit 314 transmits the ID-added document file to the document reading apparatus 400.

Figure 16:
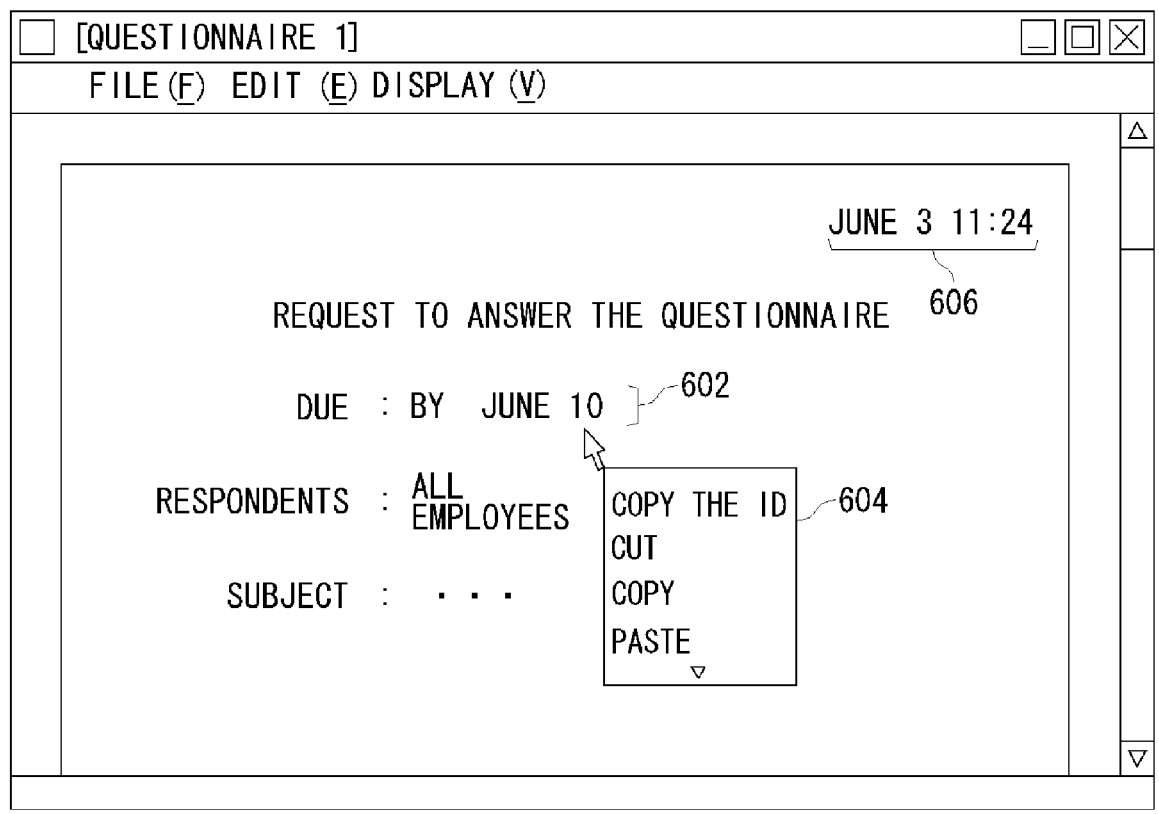
FIG. 16 is a diagram which shows a document reading screen of the document reading apparatus.

FIG. 16 shows a document reading screen 600 of the document reading apparatus 400. A certification time display area 606 in FIG. 16 corresponds to the certification time specification area 506 in FIG. 15. The document communication unit 414 receives from the document creating apparatus 300 an ID-added document file as created in FIG. 15. The ID extraction unit 408 then detects a certification time ID that has been added to the certification time specification area 506 in the ID-added document file. The time information communication unit 416 transmits time request information to the time sharing managing apparatus 250 so as to request time information corresponding to the detected certification time ID.

When the time information communication unit 260 of the time sharing managing apparatus 250 receives the time request information, the search unit 256 searches the time information storage unit 258 and finds time information corresponding to the certification time ID. The time information communication unit 260 then transmits the time information thus found to the document reading apparatus 400. After the time information communication unit 416 of the document reading apparatus 400 receives the time information, the restoration processing unit 406 converts the received time information to a character string representing the certification time, which is expressed in a given form. The time information is then added to the position of the certification time ID in the document file. Thus, the certification time display area 606 displays the certification time that the time sharing managing apparatus 250 identified as the transmission time of the document file.

A due date display area 602 corresponds to the due date specification area 502. The ID extraction unit 408 detects the specification time ID and operation expression, i.e. the operation-added time ID, that has been added to the due date specification area 502 in the ID-added document file. The time information communication unit 416 transmits time request information to the time sharing managing apparatus 250 so as to request time information corresponding to the detected specification time ID "0014".

When the time information communication unit 260 of the time sharing managing apparatus 250 receives the time request information, the search unit 256 searches the time information storage unit 258 and finds time information corresponding to the specification time ID. The time information communication unit 260 then transmits the time information thus found to the document reading apparatus 400. The time information here is "June 7". The computing unit 422 calculates according to the operation expression "+3" and obtains "June 10". The restoration processing unit 406 then adds the character string identified as "June 10" to the position of the operation-added time ID in the document file.

By the operation as stated above, time information is acquired for an ID-added document file, so that a restored document file is generated.

A document reader can extract a time ID that has been added to the certification time display area 606 or the due date display area 602 in an ID-added document file. For instance, when a document reader points the mouse cursor to the due date display area 602 to which a time ID has been added, a pull-down menu 604 is displayed. If the user then selects "copy the ID" from the certification time display area 606, the time ID added will be extracted to the memory. Since the time ID here is an operation-added time ID, "time ID '0014'+3" is extracted. The time ID extracted can also be attached to another document file. Next, with reference to FIG. 17, a mode of use of such an extracted time ID will be discussed.

FIG. 17 shows a calendar screen 700 of schedule management software displayed on the document reading apparatus 400. The calendar screen 700 is displaying a document file showing a calendar of June, 2004. Here, this document file showing a calendar will be described as an XML document. When a scheduled date and a scheduled plan are inputted, the software displays the plan in the section of the corresponding date.

A document reader inputs the time ID acquired from the pull-down menu 604 instead of a scheduled date in the schedule management software. Then, the time ID "0014" is added as an XML tag to a certain position of a document file in the schedule management software. For example, when the scheduled plan is "deadline of questionnaire" and the operation-added time ID extracted from the due date display area 602 is specified, the plan is correspondingly displayed in a plan display area 704 for "June 10". Also, when a scheduled plan of "drafting questionnaire" is inputted with a scheduled date specified as the operation-added time ID with "−2", the scheduled plan is correspondingly displayed in a plan display area 702 for "June 8".

When the schedule management software shown in FIG. 17 displays a document file on the screen, the ID extraction unit 408 extracts a time ID from the document file. The restoration processing unit 406 then identifies the scheduled date specified, on the basis of the extracted time ID. If a document creator sets a new deadline for a questionnaire in the due date specification area 502 shown on the document creation screen 500, the time information corresponding to the time ID "0014" in the file for a document reader will also be updated. In this case, the position of the plan display area 702 or the plan display area 704 will also be modified automatically.

Figure 18:
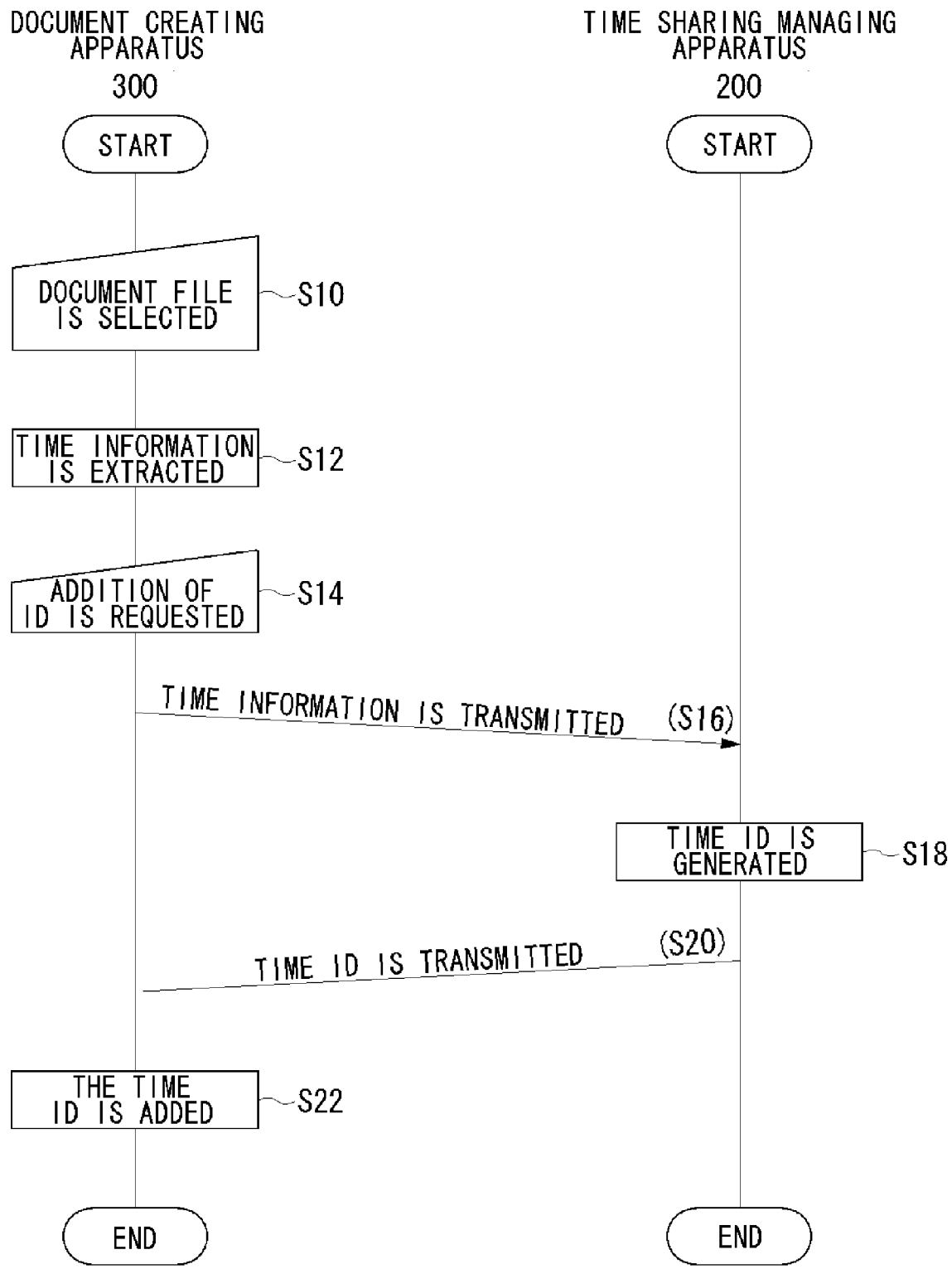
FIG. 18 is a flowchart which shows a process of acquiring a specification time ID.

FIG. 18 is a flowchart which shows a process of acquiring a specification time ID in the document creating apparatus 300. First, a document creator selects a document file to be processed via the user interface processing unit 302 (S10). The time extraction unit 306 then extracts time information from the selected document file (S12). After the extraction, the document creator instructs the addition of a specification time ID corresponding to the time information (S14).

The time information communication unit 316 transmits specification time ID request information, which includes the time information, to the time sharing managing apparatus 250 (S16). The ID setting unit 254 then sets a specification time ID (S18). The time information communication unit 260 transmits the specification time ID to the document creating apparatus 300 (S20). Thereafter, the ID adding unit 308 adds the specification time ID received to the document file (S22). Thus, an ID-added document file including a specification time ID is generated.

Figure 19:
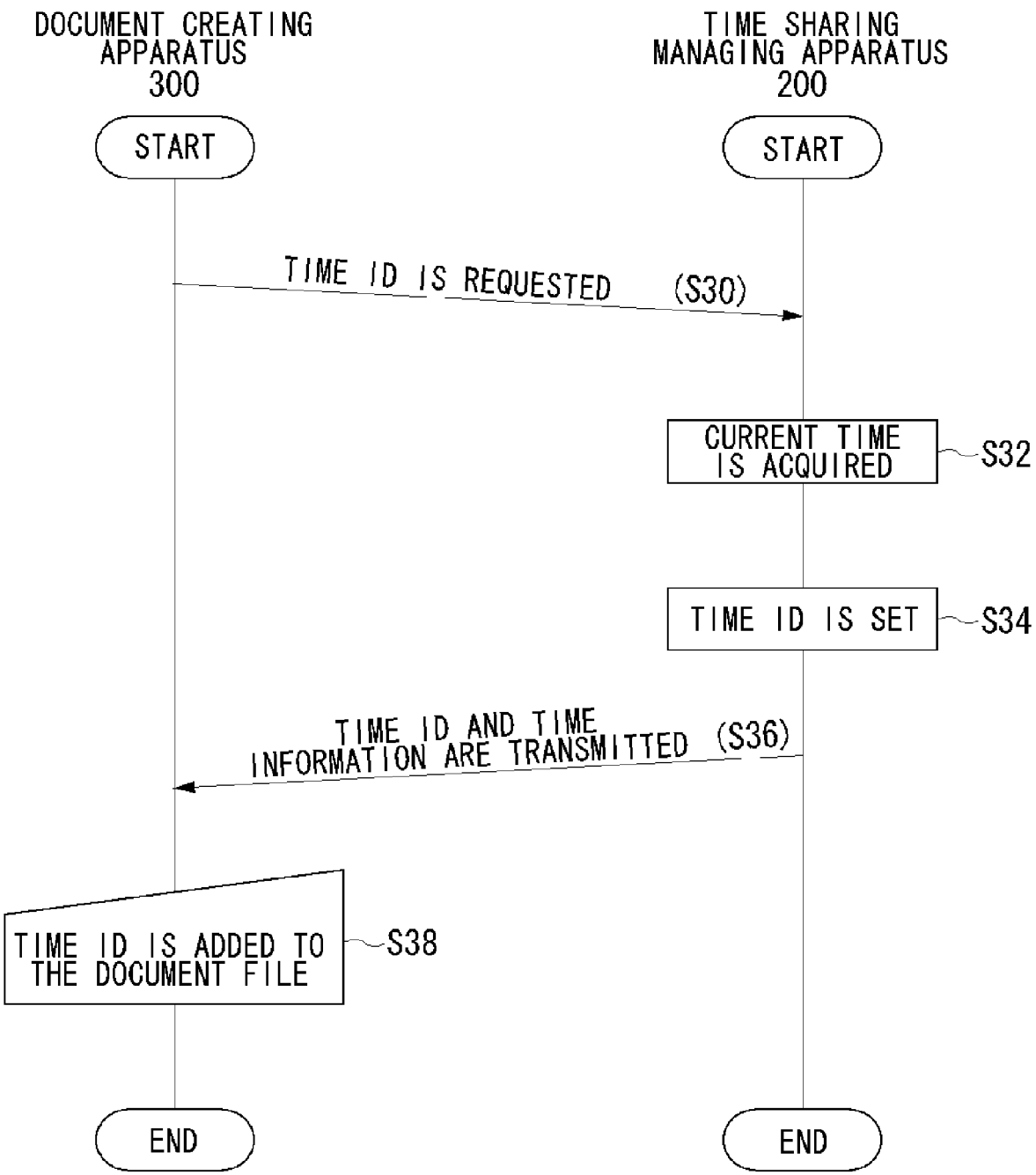
FIG. 19 is a flowchart which shows a process of acquiring a certification time ID.

FIG. 19 is a flowchart which shows a process of acquiring a certification time ID in the document creating apparatus 300. In accordance with the instruction from the document creator, the time information communication unit 316 transmits certification time ID request information to the time sharing managing apparatus 250 (S30). When the time information communication unit 260 receives the certification time ID request information, the time measuring unit 264 measures the current time to generate time information (S32). The ID setting unit 254 then sets a certification time ID for the time information (S34). The time information communication unit 260 transmits the certification time ID and the time information to the document creating apparatus 300 (S36). The document creator adds the certification time ID received to the document file to be processed (S38).

Figure 20:
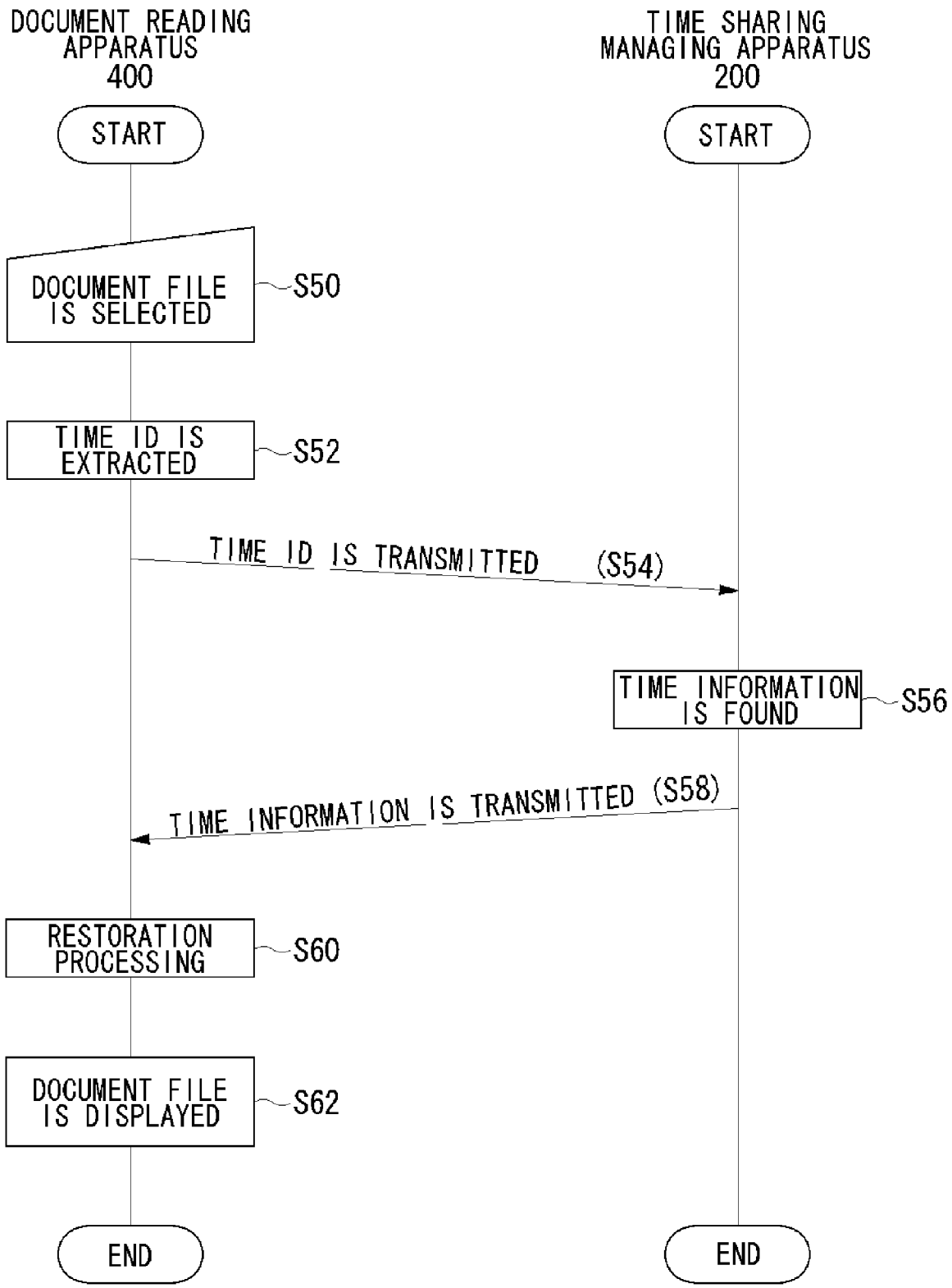
FIG. 20 is a flowchart which shows a process of acquiring time information.

FIG. 20 is a flowchart which shows a process of acquiring time information in the document reading apparatus 400. A document reader selects an ID-added document file to be processed from among ID-added document files stored in the ID-added document file storage unit 312 (S50). The ID extraction unit 408 then extracts a time ID from the ID-added document file (S52). The time information communication unit 416 transmits time request information including the extracted time ID to the time sharing managing apparatus 250 (S54). The search unit 256 then finds time information corresponding to the time ID in the time information storage unit 258 (S56). The time information communication unit 260 transmits the extracted time information to the document reading apparatus 400 (S58). On the basis of the time information received from the time information communication unit 416, the restoration processing unit 406 adds a character string representing the time information to the part where the time ID has been added (S60). The user interface processing unit 402 then displays the document file in which the time ID has been converted to the time character string on the screen (S62).

Given above is an explanation based on the exemplary embodiment. The embodiment is intended to be illustrative only and it will be obvious to those skilled in the art that various modifications to constituting elements and processes could be developed and that such modifications are also within the scope of the present invention.

This embodiment describes the document managing system 192 for sharing time information. In another embodiment of the present invention, however, sharing a variety of information other than time information is also possible. For example, a document file for giving notice of a meeting includes various contents, such as the topic, participants and place. According to the present invention, such various information on the contents of the document file can be synchronously managed by multiple people.

INDUSTRIAL APPLICABILITY

The present invention has an advantage in that time information can be cooperatively managed by multiple people.

The invention claimed is:

1. A time sharing managing apparatus, comprising:
an identification (ID) request receiving unit for receiving ID request information for requesting the issuance of a time ID uniquely identifying time information;
a time information generating unit for measuring the time and generating time information when the ID request information is received;
a rule storage unit for storing rule information stating a rule for setting a time ID;
an ID setting unit for setting a time ID for the generated time information with reference to the rule information;
a time information storage unit for relating and storing the time ID as set and the time information;
an ID transmitting unit for transmitting the time ID to the transmission source of the ID request information;
a time request receiving unit for receiving time request information which includes the time ID and which inquires for time information corresponding to the time ID;
a time information finding unit for finding time information that has been related to the time ID included in the time request information, in said time information storage unit; and
a time information transmitting unit for transmitting the time information thus found to the transmission source of the time request information.

2. A document creating apparatus, comprising:
a document storage unit for storing a document file that includes a character string representing a time with a given form of expression as a content;
a time extraction unit for extracting said character string from the document file by detecting said form of expression;
an identification (ID) requesting unit for transmitting ID request information to a time sharing managing apparatus for managing time IDs so as to request the issuance of a time ID, which uniquely identifies time information, for the time information represented by the character string thus extracted;
an ID receiving unit for receiving the time ID that was related to the time information by said time sharing managing apparatus;
an ID adding unit for adding the received time ID to the document file;
a document transmitting unit for transmitting the document file with the time ID added thereto to a document reading apparatus for viewing a document file;
a change input unit for receiving an input from a document creator for changing the time information included as a content of the document file; and
a time change transmitting unit for transmitting time change information to said time sharing managing apparatus so as to request re-relating of the time information thus changed to the time ID when the input for changing the time information is received.

3. A time sharing managing method, comprising:
receiving identification (ID) request information for requesting the issuance of a time ID uniquely identifying time information;
measuring the time and generating time information when the ID request information is received;
setting a time ID for the generated time information with reference to rule information stating a rule for setting a time ID;
relating the time ID as set and the time information in a time ID table that is defined in a storage;
transmitting the time ID to the transmission source of the ID request information;
receiving time request information which includes the time ID and which inquires for time information corresponding to the time ID;
finding time information that has been related to the time ID included in the time request information, in the time ID table; and
transmitting the time information thus found to the transmission source of the time request information.

4. A document creating method, comprising:
extracting from storage a character string representing a time with a given form of expression from a document file that includes said character string as a content, by detecting said form of expression;

transmitting identification (ID) request information to a time sharing managing apparatus for managing time IDs so as to request the issuance of a time ID, which uniquely identifies time information, for the time information represented by the character string thus extracted;

receiving the time ID that was related to the time information by said time sharing managing apparatus;

adding the received time ID to the document file;

transmitting the document file with the time ID added thereto to a document reading apparatus for viewing a document file;

receiving an input from a document creator for changing the time information included as a content of the document file; and transmitting time change information to said time sharing managing apparatus so as to request re-relating of the time information thus changed to the time ID when the input for changing the time information is received.

5. A computer program product for time sharing management, comprising:

a module which receives identification (ID) request information for requesting the issuance of a time ID uniquely identifying time information;

a module which measures the time and generates time information when the ID request information is received;

a module which stores in storage rule information stating a rule for setting a time ID;

a module which sets a time ID for the generated time information with reference to the rule information;

a module which stores a time ID table relating the time ID as set and the time information;

a module which transmits the time ID to the transmission source of the ID request information;

a module which receives time request information which includes the time ID and which inquires for time information corresponding to the time ID;

a module which finds time information that has been related to the time ID included in the time request information, in the time ID table; and a module which transmits the time information thus found to the transmission source of the time request information.

6. A computer program product for creating a document, comprising:

a module which stores in storage a document file that includes a character string representing a time with a given form of expression as a content;

a module which extracts said character string from the document file by detecting said form of expression;

a module which transmits identification (ID) request information to a time sharing managing apparatus for managing time IDs so as to request the issuance of a time ID, which uniquely identifies time information, for the time information represented by the character string thus extracted;

a module which receives the time ID that was related to the time information by said time sharing managing apparatus;

a module which adds the received time ID to the document file;

a module which transmits the document file with the time ID added thereto to a document reading apparatus for viewing a document file;

a module which receives an input from a document creator for changing the time information included as a content of the document file; and a module which transmits time change information to said time sharing managing apparatus so as to request re-relating of the time information thus changed to the time ID when the input for changing the time information is received.

* * * * *